(12) United States Patent
Habite et al.

(10) Patent No.: US 12,450,711 B2
(45) Date of Patent: Oct. 21, 2025

(54) COMPUTER-IMPLEMENTED METHOD AND A SYSTEM FOR ESTIMATING A PITH LOCATION WITH REGARD TO A TIMBER BOARD

(71) Applicant: MICROTEC AB, Linköping (SE)

(72) Inventors: Tadios Habite, Växjö (SE); Osama Abdeljaber, Växjö (SE); Anders Olsson, Växjö (SE)

(73) Assignee: MICROTEC AB, Linköping (SE)

( * ) Notice: Subject to any disclaimer, the term of this patent is extended or adjusted under 35 U.S.C. 154(b) by 512 days.

(21) Appl. No.: 18/048,060

(22) Filed: Oct. 20, 2022

(65) Prior Publication Data
US 2023/0125887 A1 Apr. 27, 2023

(30) Foreign Application Priority Data
Oct. 22, 2021 (IT) ........................ 102021000027281

(51) Int. Cl.
*G06T 7/00* (2017.01)
*G06N 3/045* (2023.01)

(52) U.S. Cl.
CPC ........... *G06T 7/0004* (2013.01); *G06N 3/045* (2023.01); *G06T 2207/20081* (2013.01); *G06T 2207/20084* (2013.01); *G06T 2207/30161* (2013.01)

(58) Field of Classification Search
CPC .. G01N 21/8986; G06N 3/045; G06N 3/0455; G06N 3/0464; G06N 3/0475;
(Continued)

(56) References Cited

U.S. PATENT DOCUMENTS

| | | | | |
|---|---|---|---|---|
| 4,831,545 A | * | 5/1989 | Floyd | G01N 21/8986 250/559.47 |
| 4,916,629 A | * | 4/1990 | Bogue | G01N 21/8986 250/559.47 |

(Continued)

OTHER PUBLICATIONS

Georg Kandler et al., "An algorithm for the geometric reconstruction of knots within timber boards based on fibre angle measurements," Aug. 11, 2016, Construction and Building Materials 124 (2016), pp. 945-958.*

(Continued)

*Primary Examiner* — Omar S Ismail
(74) *Attorney, Agent, or Firm* — Chrisman Gallo Tochtrop LLC

(57) ABSTRACT

A computer-implemented method for estimating a pith location with regard to a timber board, including:
  receiving a pixelated actual digital image of each lateral face of at least a longitudinal part of the timber board, extending along a longitudinal axis of the timber board;
  identifying an input portion in said longitudinal part of the timber board, where the input portion is a portion of the timber board which extends along the longitudinal axis;
  extracting from each pixelated actual digital image of the longitudinal part of the timber board, an input image representing said input portion, so obtaining four input images representing an appearance of the input portion at each lateral face of the timber board;
  inputting said four input images into the input layer of an artificial neural network and making the artificial neural network operate; and
  reading, at an output layer of the artificial neural network, output data defining a location of a pith of a log from which the timber board has been obtained, in a plane perpendicular to the longitudinal axis of the timber board at the input portion.

19 Claims, 26 Drawing Sheets

(58) Field of Classification Search
CPC .................... G06N 3/09; G06N 3/094; G06T 2207/20081; G06T 2207/20084; G06T 2207/30161; G06T 7/0004; G06V 10/82
See application file for complete search history.

(56) References Cited

U.S. PATENT DOCUMENTS

| | | | | |
|---|---|---|---|---|
| 2008/0078473 | A1* | 4/2008 | Huang | G01N 33/46 144/392 |
| 2008/0140248 | A1* | 6/2008 | Moore | G01N 21/8986 700/223 |
| 2008/0246971 | A1* | 10/2008 | Huang | G01N 21/47 356/446 |
| 2008/0283151 | A1* | 11/2008 | Floyd | G01N 29/07 144/416 |
| 2018/0137390 | A1* | 5/2018 | Brundage | G06F 18/28 |
| 2020/0184620 | A1* | 6/2020 | Biernacki | G01N 21/8851 |
| 2021/0287430 | A1* | 9/2021 | Li | G06T 7/74 |

OTHER PUBLICATIONS

Marc Oliver Kuehn, "The automatic detection and rectification of surface and aesthetic defects in the production of wooden panels," Sep. 2015, PhD Thesis, Coventry University ,2016, pp. 91-120.*
Philip Isola et al., "Image-to-Image Translation with Conditional Adversarial Networks," Jul. 2017, Proceedings of the IEEE Conference on Computer Vision and Pattern Recognition (CVPR), 2017, pp. 1125-1130.*
Markus Lukacevica et al., "A 3D model for knots and related fiber deviations in sawn timber for prediction of mechanical properties of boards ," Jan. 25, 2019, Materials and Design 166 (2019), pp. 1-16.*
S. Ormarsson et al., "A numerical study of the shape stability of sawn timber subjected to moisture variation," Nov. 1999, Wood Science and Technology 33 (1999), pp. 407-412.*
I. Robert Kliger et al.,"Bending properties of Norway spruce timber. Comparison between fast- and slow-grown stands and influence of radial position of sawn timber," Nov. 25, 1997, American Science , 55(1998), pp. 349-354.*
M. Hu et al.,"Assessment of a Three-Dimensional Fiber Orientation Model for Timber," Nov. 21, 2016, Wood and Fiber Science, vol. 48 No. 4 (2016), pp. 272-288.*
Suchendra M. Bhandarkar et al., "A Computer Vision System for Lumber Production Planning," Aug. 6, 2002,Proceedings Fourth IEEE Workshop on Applications of Computer Vision. WACV'98 (Cat. No. 98EX201), pp. 134-138.*
In Hu et al.,"Modelling local bending stiffness based on fibre orientation in sawn timber," Sep. 7, 2018, European Journal of Wood and Wood Products (2018) 76:1605, pp. 1605-1618.*
Anders Olsson et al.,Strength grading on the basis of high resolution laser scanning and dynamic excitation: a full scale investigation of performance, Oct. 31, 2016, Eur. J. Wood Prod. (2017) 75:,pp. 17-27.*
Lourenço Panosso Perlin et al.,"New method to locate the pith position in a wood cross-section based on ultrasonic measurements," Mar. 20, 2018, Construction and Building Materials 169 (2018),pp. 733-737.*
Andreas Briggert et al.,"Three-dimensional modelling of knots and pith location in Norway spruce boards using tracheid-effect scanning," Apr. 17, 2016,Eur. J. Wood Prod. (2016) 74,pp. 725-734.*
Blouin, D., et al., Wood Quality Of Norway Spruce Grown In Plantations In Quebec. Wood and Fiber Science; vol. 26, No. 3; 1994; pp. 342-353.
Ormarsson, S., et al., A Numerical Study Of The Shape Stability Of Sawn Timber Subjected To Moisture Variation: Part 2: Simulation Of Drying Board. Wood Science and Technology; vol. 33, 1999; pp. 407-423.
Kliger, I. R., et al., Bending Properties Of Norway Spruce Timber. Comparison Between Fast-And Slow-Grown Stands And Influence Of Radial Position Of Sawn Timber; Annales Des Sciences Forestieres ; INRA/EDP Sciences; vol. 55, No. 3 ; 1998 ; pp. 349-358.
Johansson, C. J., Grading of Timber With Respect To Mechanical Properties; Timber Engineering; Chapter 3; 2003, pp. 23-43.
Hu, M, et al., Assessment of a Three-Dimensional Fiber Orientation Model for Timber; Wood and Fiber Science; vol. 48, No. 4, 2016, pp. 271-290.
Lukacevic, M., et al., A 3D Model For Knots and Related Fiber Deviations in Sawn Timber for Prediction of Mechanical Properties of Boards; Materials and Design, vol. 166, No. 107617, 2019, pp. 1-18.
Briggert, A., et al., Three-Dimensional Modelling of Knots and Pith Location in Norway Spruce Boards Using Tracheid-Effect Scanning; European Journal of Wood and Wood Products, vol. 74, 2016, pp. 725-739.
Kandler, G., et al., An Algorithm for the Geometric Reconstruction of Knots Within Timber Boards Based on Fibre Angle Measurements, Construction and Building Materials, vol. 124, 2016, pp. 945-960.
Perlin, L., et al., New Method to Locate the Pith Position in a Wood Cross-Section Based on Ultrasonic Measurements, Construction and Building Materials, vol. 169, 2018, pp. 733-739.
Lilly, J., et al., Generalized Morse Wavelets as a Superfamily of Analytic Wavelets, IEEE Transactions on Signal Processing, vol. 60, No. 11, Nov. 2012, pp. 6036-6041.
Lagarias, J., et al., Convergence Properties of the Nelder-Mead Simplex Method in Low Dimensions, SIAM Journal on Optimization, 1998, vol. 9, No. 1, pp. 112-147.
Habite, T., et al., Automatic Detection of Pith Location Along Norway Spruce Timber Boards on the Basis of Optical Scanning, European Journal of Wood and Wood Products, 2020, vol. 78, pp. 1061-1074.
Habite, T., et al., Automatic Detection of Annual Rings and Pith Location Along Norway Spruce Timber Boards Using Conditional Adversarial Networks, Wood Science and Technology, 2021, vol. 55, No. 2, pp. 461-488.
Kiranyaz, S., et al., Real-Time Patient-Specific ECG Classification by 1D Convolutional Neural Networks, IEEE Transactions on Bio-Medical Engineering, vol. 10, No. 1109, Aug. 2015, pp. 1-13.
Olsson, A., et al., Strength Grading on the Basis of High Resolution Laser Scanning and Dynamic Excitation: A Full Scale Investigation of Performance, European Journal of Wood and Wood Products, 2017, vol. 75, pp. 17-31.
Hu, M., et al., Modelling Local Bending Stiffness Based on Fibre Orientation in Sawn Timber, European Journal of Wood and Wood Products, 2018, vol. 76, pp. 1605-1621.
Goodfellow, I., et al., Deep Learning, MIT Press, 2017, pp. 1-800.
Ruder, S., An Overview of Gradient Descent Optimization Algorithms, Insight Centre for Data Analytics, Nui Galway, Jun. 15, 2017, pp. 1-14.
Kingma, D., et al., Adam: A Method for Stochastic Optimization, ICLR 2015, Jan. 30, 2017, pp. 1-15.
Isola, P., et al., Image-to-Image Translation With Conditional Adversarial Networks, Berkley AI Research (BAIR) Laboratory, UC Berkley, Nov. 26, 2018, pp. 1-17.
Abadi, M., TensorFlow: Learning Functions at Scale, Google Brain, USA, icfp 16, Sep. 18-24, 2016, p. 1.
Sall, H., Spiral Grain in Norway Spruce, Wood Design and Technology, vol. 22, No. 2002, Vaxjo University Press, 2002, pp. 1-182.
Briggert, A., et al., Tracheid Effect Scanning and Evaluation of In-Plane and Out-of-Plane Fiber Direction in Norway Spruce Timber, Wood and Fiber Science, vol. 50, No. 4, 2018, pp. 1-19.
Van Den Oord, A., et al., WaveNet: A Generative Model for Raw Audio, Google Deepmind, London, UK, Sep. 19, 2016, pp. 1-15.
Abdeljaber, O., Real-Time Vibration-Based Structural Damage Detection Using One-Dimensional Convolutional Neural Networks, Journal of Sound and Vibration, vol. 10, No. 043, Feb. 2017, pp. 1-18.
Zhang, W., et al., A Deep Convolutional Neural Network With New Training Methods for Bearing Fault Diagnosis Under Noisy Environment and Different Working Load, Mechanical Systems and Signal Processing, vol. 100, 2018, pp. 439-453.

(56) References Cited

OTHER PUBLICATIONS

Soest, J., et al., A Simple Optical Scanner for Grain Defects, Fifth International Conference on Scanning Technology and Process Control for the Wood Products Industry, Atlanta GA USA, Oct. 1993, pp. 1-12.
Ronneberger, O., et al., U-Net: Convolutional Networks for Biomedical Image Segmentation, IN: Navab N., et al. (Eds). MICCAI 2015, Part III, 2015, pp. 234-241.
Kiranyaz, S., et al., 1D Convolutional Neural Networks and Applications: A Survey, Mechanical Systems and Signal Processing, vol. 151, 2021, 107398, pp. 1-21.
Norell, K., Creating Synthetic Log End Face Images, Image and Signal Processing and Analysis, 2009, pp. 353-358.
Bhandarkar, S.M., et al., A Computer Vision System for Lumber Production Planning, Applications of Computer Vision, Oct. 19, 1998, pp. 134-139.
Zolotarev, F., et al., Modelling Internal Knot Distribution Using External Log Features, Computers and Electronics in Agriculture, vol. 179, Oct. 12, 2020, 105795, pp. 1-11.

* cited by examiner

COMPUTER-IMPLEMENTED METHOD AND A SYSTEM FOR ESTIMATING A PITH LOCATION WITH REGARD TO A TIMBER BOARD

The present invention relates to a computer-implemented method and a system for estimating a pith location with regard to a timber board. The pith to be identified is the pith of the log from which the timber board has been obtained. Its location is estimated in a plane perpendicular to the longitudinal axis of the board.

It is well known that mechanical properties of sawn timber depend on both clear wood properties and occurrence of knots ([3] Kliger, I. R., Perstorper, M., & Johansson, G. (1998). *Bending properties of Norway spruce timber. Comparison between fast- and slow-grown stands and influence of radial position of sawn timber. In Annales des sciences forestières* (Vol. 55, No. 3, pp. 349-358). EDP Sciences, and [4] Johansson, C. J. (2003). *Timber Engineering*, Chapter 3) 1998), meaning that relationships between different properties of sawn timber are not identical to those valid for clear wood. For clear wood of softwood species, such as Norway spruce [*Picea abies* (L.) H. Karst], strong relationships exist between the distance to pith and different mechanical and physical properties. For instance, density, longitudinal modulus of elasticity (MOE), and modulus of rupture (MOR) increase significantly in radial direction from pith to bark, whereas the longitudinal shrinkage coefficient decreases in the same direction ([1] Blouin, D., Beaulieu, J., Daoust, G., & Poliquin, J. (2007). *Wood quality of Norway spruce grown in plantations in Quebec. Wood and Fiber Science*, 26(3), 342-353; [2] Ormarsson, S., Dahlblom, O., & Petersson, H. (1999). *A numerical study of the shape stability of sawn timber subjected to moisture variation: Part 2: Simulation of drying board. Wood Science and Technology*, 33(5), 407-423). In general, the annual ring width also decreases from pith to bark, but thinning of trees in the stand may change this condition. For sawn timber, location of pith along the board determines the radial direction of knots, and direction and geometry of knots in turn determine local fibre orientation. Knowledge of pith location is then needed to establish detailed and accurate three-dimensional (3D) models of sawn timber, including geometry of knots and local fibre orientation on the basis of surface scanning, and attempts to develop such models have been made ([5] Hu, M., Olsson, A., Johansson, M., Oscarsson, J., & Serrano, E. (2016). *Assessment of a three-dimensional fiber orientation model for timber. Wood and Fiber Science*, 48(4), 271-290); [6] Lukacevic, M., Kandler; G., Hu, M., Olsson, A., & Füssl, J. (2019). *A 3D model for knots and related fiber deviations in sawn timber for prediction of mechanical properties of boards. Materials & Design*, 166, 107617). Furthermore, pith location and annual ring width affect the visual appearance of wood products. Board pieces with the pith visible on the surface are often downgraded to lower appearance classes (EN 1611-1:1999, 1999). In some cases, boards with the pith enclosed within the cross section should be rejected (EN 1611-1:1999, 1999). Thus, knowledge of location of pith is needed for detailed modelling of local fibre direction in sawn timber ([5], [6]), and very useful for assessment of stiffness and strength ([15] Olsson, A., & Oscarsson, J. (2017). *Strength grading on the basis of high resolution laser scanning and dynamic excitation: a full scale investigation of performance. European Journal of Wood and Wood Products*, 75(1), 17-31; [16] M. Hu, A. Olsson, M. Johansson and J. Oscarsson. *Modelling local bending stiffness based on fibre orientation in sawn timber*. (2018), *European Journal of Wood and Wood Products*, 76 (6), 1605-1621) as well as for assessment of shape stability [2]. It is also important for various other purposes in the woodworking industry. Therefore, it would be of considerable practical value if industry scanners used for automated assessment of wood specimens could be used also to accurately determine location of pith along boards.

Some attempts have been made to detect the pith location of sawn timber boards ([7] Briggert, A., Olsson, A., & Oscarsson, J. (2016). *Three-dimensional modelling of knots and pith location in Norway spruce boards using tracheid-effect scanning. European Journal of Wood and Wood Products*, 74(5), 725-739; [8] Kandler, G., Lukacevic, M. and Füssl, J., 2016. *An algorithm for the geometric reconstruction of knots within timber boards based on fibre angle measurements. Construction and Building Materials*, 124, pp. 945-960; [9] Perlin, L. P., do Valle, A., & de Andrade Pinto, R. C. (2018). *New method to locate the pith position in a wood cross-section based on ultrasonic measurements. Construction and Building Materials*, 169, 733-739; [12] Habite, T., Olsson, A. & Oscarsson, J. *Automatic detection of pith location along Norway spruce timber boards on the basis of optical scanning. Eur. J. Wood Prod.* 78, 1061-1074 (2020). https://doi.org/10.1007/s00107-020-01558-1). In the work presented by Perlin et al. [9], an ultrasonic tomography measurement technique was proposed to locate the pith of a wood cross section. The proposed method was based on the fact that acoustic waves travel faster in radial direction than in tangential direction. Thus, the method involved mounting a fixed transmitter transducer and moving the receiver transducer around the cross section of the specimen to record several readings of ultrasonic pulse velocities (UPVs). According to [9] the pith can be located at a position where most of the highest velocity paths intersect. However, only two test specimens, a 25 cm diameter circular *Eucalyptus grandis* specimen and a 20 cm square *Aplueia leiocarpa*, were used to validate the proposed method. Additionally, the accuracy of the proposed method could be affected by the presence of internal defects within the timber cross section [9].

Briggert et al. [7] and Kandler et al. [8] developed methods to reconstruct the 3D geometry of knots on the basis of data from surface laser scanning of Norway spruce timber boards. Both methods comprised detection of knot areas visible on the longitudinal surfaces of the board by means of tracheid effect scanning ([24] Briggert, A., Hu, M., Olsson, A., & Oscarsson, J. (2018). *Tracheid effect scanning and evaluation of in-plane and out-of-plane fibre direction in Norway spruce timber. Wood and Fiber Science*, 50(4), 411-429) and utilised the detected orientation of knots to estimate the pith location along the length direction of the board. However, to be able to determine which knot surfaces (visible on different board surfaces) are parts of the same knot, knowledge of an approximate location of pith was needed already from the outset, which was obtained by examination of the end cross sections at the board ends.

In addition to the above-mentioned studies, numerous studies have utilised images of cross sections of logs generated from computer tomography (CT) X-ray scanning to predict the pith location of logs. Most of the studies involved (1) detection of growth rings on the cross-sectional CT images of the log slices with an assumption that the growth rings are concentric circles centred at the pith, and (2) application of Hough transform (HT) to the detected growth rings to estimate the pith location of the log slices. For a brief presentation of these research works, see [12].

Information obtained from optical scanning of timber boards has also been utilised to automatically and non-destructively estimate the pith location of knot-free clear wood sections along boards [12]. The first step in the proposed method presented in [12] was to automatically identify knot-free clear wood sections along the board by considering local fibre directions on the surfaces. Then a continuous wavelet transform (CWT) was applied ([10] Lilly, J. M. and Olhede, S. C., 2012. *Generalized Morse wavelets as a superfamily of analytic wavelets. IEEE Transactions on Signal Processing*, 60(11), pp. 6036-6041), with the generalised Morse wavelet method, to low-pass-filtered images of boards (pre-processed grayscale board images) to detect the annual ring width on all four longitudinal surfaces around the board. Finally, assuming that annual rings are shaped as concentric circles with the pith in the centre and with constant distance between the rings, the pith location of knot-free board sections was estimated through a simplex-based optimisation technique ([11] Lagarias, J. C., Reeds, J. A., Wright, M. H. and Wright, R. E., 1998. *Convergence properties of the Nelder-Mead simplex method in low dimensions. SIAM Journal on optimization*, 9(1), pp. 112-147). The proposed algorithm was tested on a sample of 104 Norway spruce boards and the median estimation error of the location of pith was less than 5 mm. In detail for a sub-sample of boards with the pith located within the cross section, median estimation errors of 2.3 mm and 3.1 mm in the larger and smaller direction of the board cross section, respectively, were obtained. For a larger sub-sample of boards with the pith located outside the board cross section in most positions along the boards, slightly higher estimation errors were obtained, with a median of 2.6 mm and 3.8 mm in the respective directions. However, the accuracy of the method was limited by the assumptions that the growth rings would be concentric circles with the pith in the centre and that the distance between consecutive growth rings would be constant. Annual rings of real board cross sections do not comply very well to these assumptions. Additionally, the filter parameters needed for the pre-processing of the input grayscale image may need frequent manual adjustment, depending on the quality and characteristics of the scanned board surfaces, which may be an obstacle for industrial applications. Regarding calculation time, the method took approximately 180 ms to determine the pith location of a single clear wood section, which is too slow considering typical industry speed requirements.

In this context, the main technical task at the basis of the present invention is to remedy the aforementioned drawbacks.

An additional task of the present invention is then to develop an accurate, operationally simple and robust method and algorithm, which is solely based on information obtained from optical scanning of longitudinal surfaces, to estimate the pith location of timber boards.

It is in particular a task of the present invention, to develop an accurate, operationally simple and robust method and algorithm, which is solely based on information obtained from optical scanning of longitudinal surfaces, to estimate the pith location at knot-free clear wood sections of timber boards.

A specific additional task of the present invention is to develop a method and algorithm which are computationally fast.

The stated main technical task is substantially achieved by the subject matter defined in the appended independent claims.

Particular embodiments of the present invention are defined in the corresponding dependent claims.

Further features and advantages of the present invention will become more apparent from the detailed description of some preferred, but not exclusive, embodiments that follows and which will refer to the accompanying drawings, wherein.

Figure 4A:
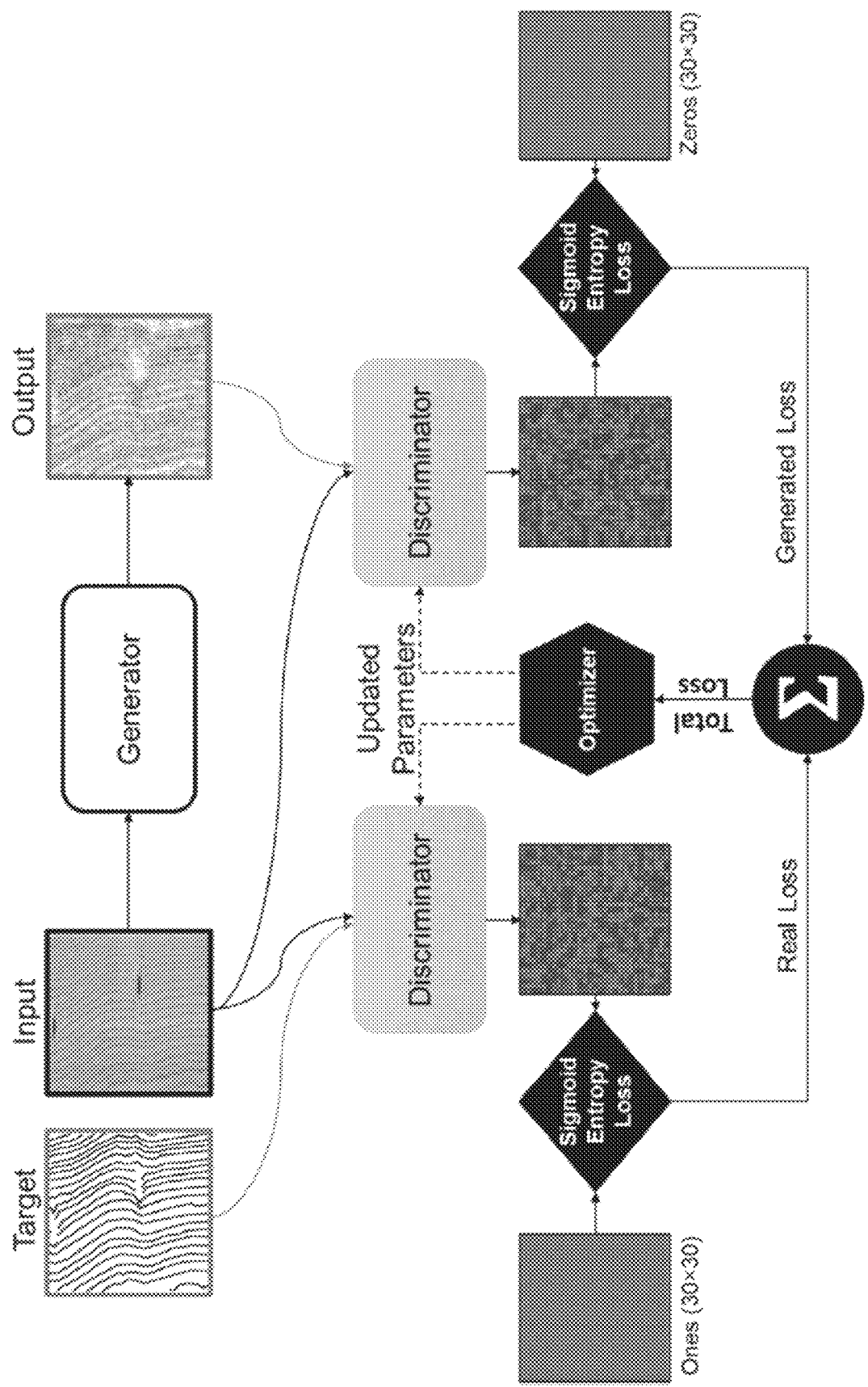
Figure 4B:
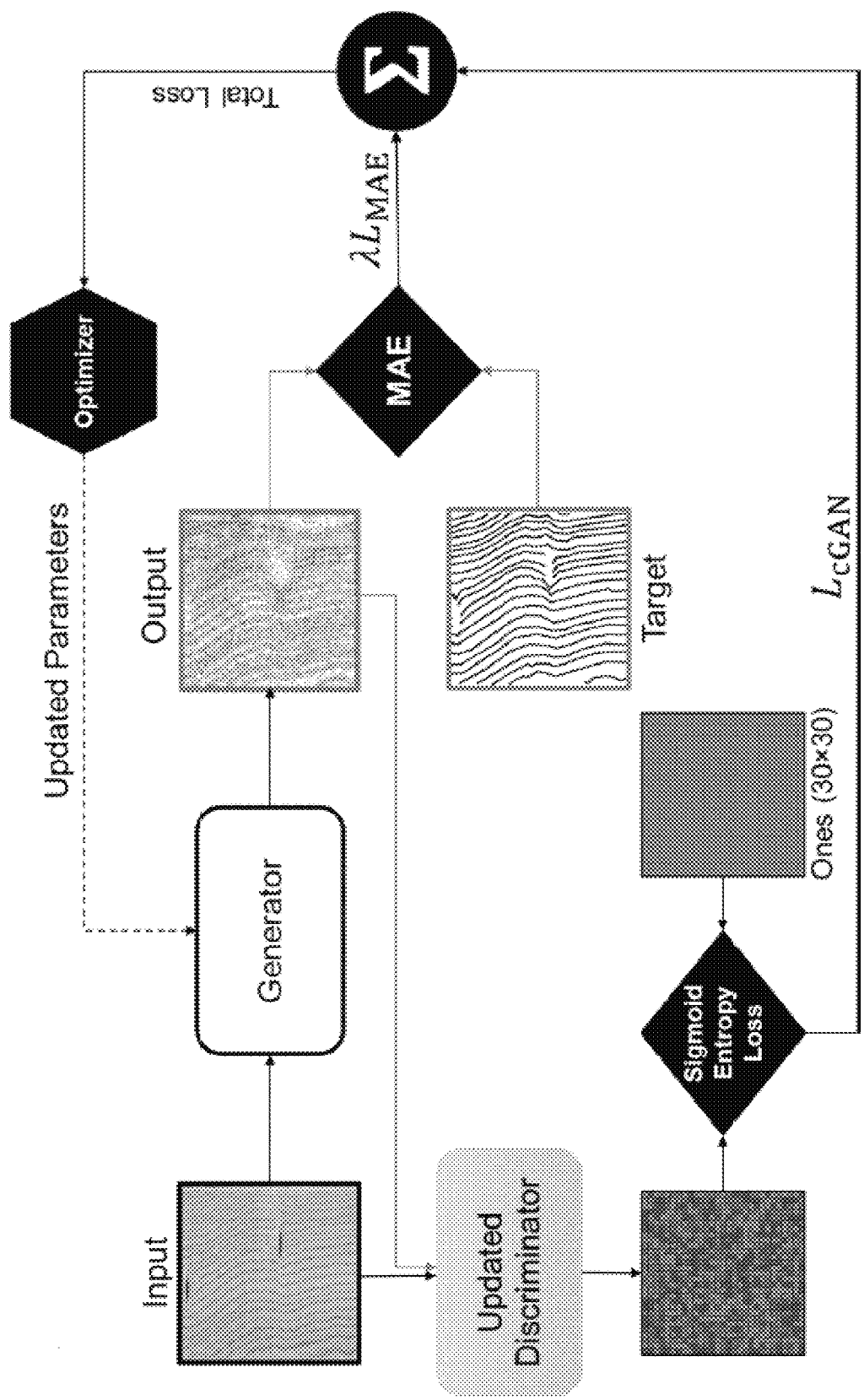
Figure 5:
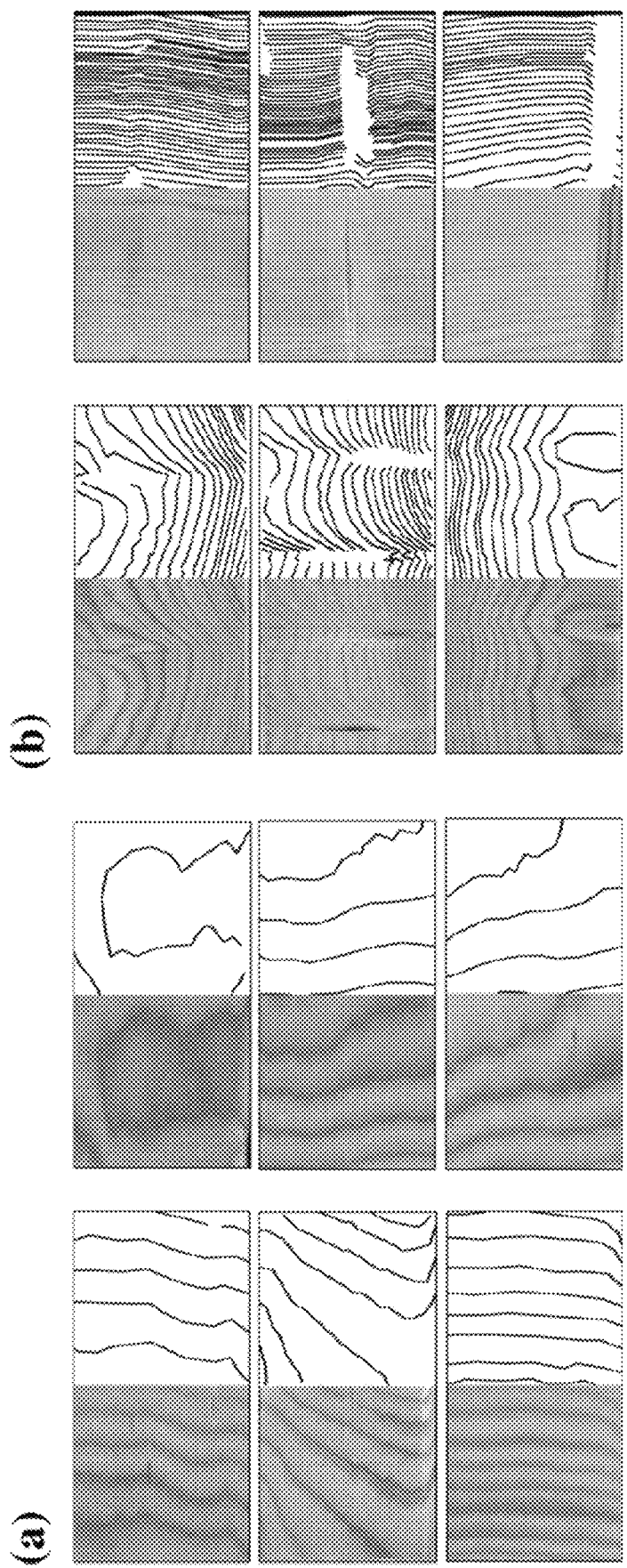
Figure 6:
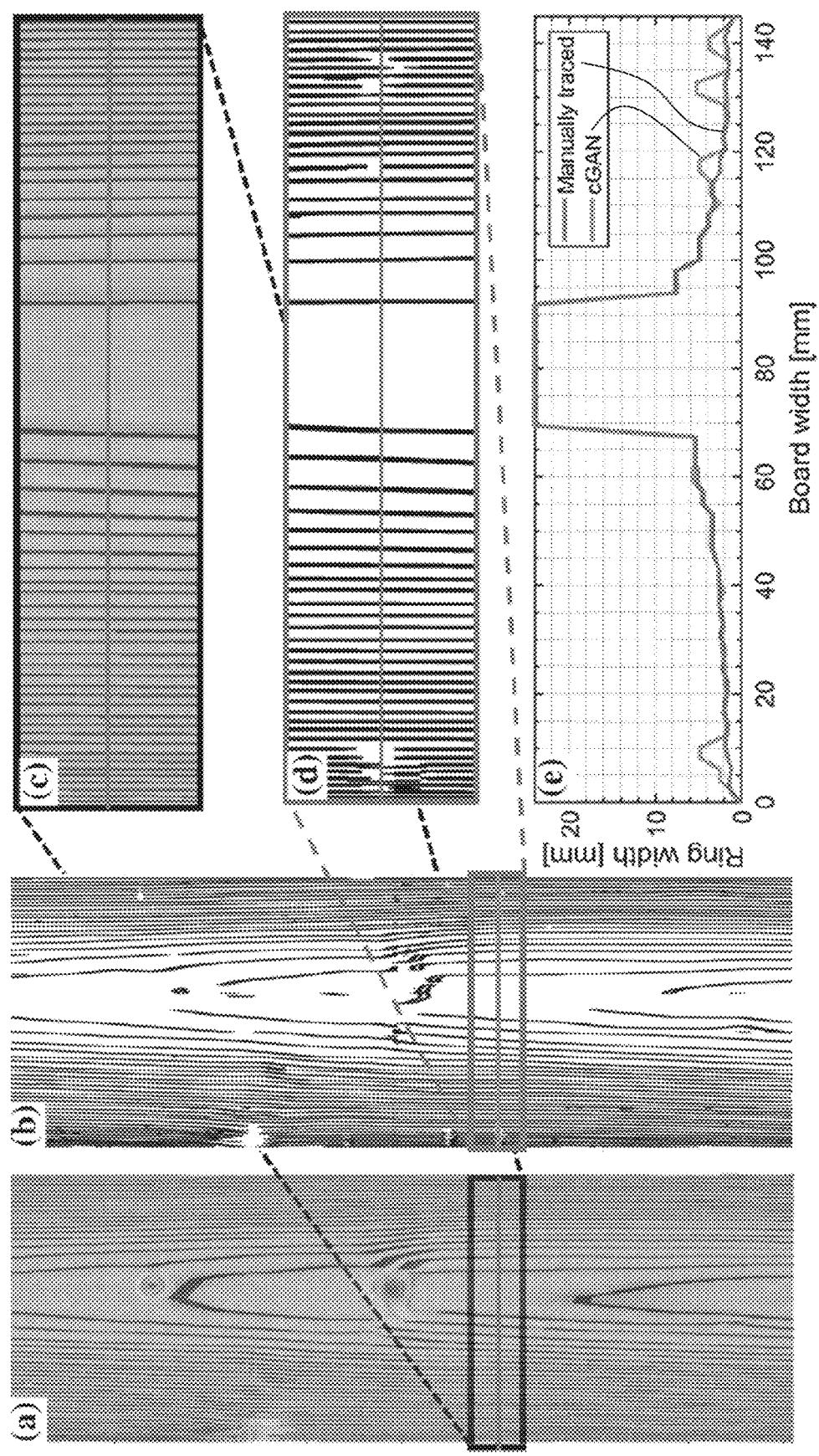
Figure 7:
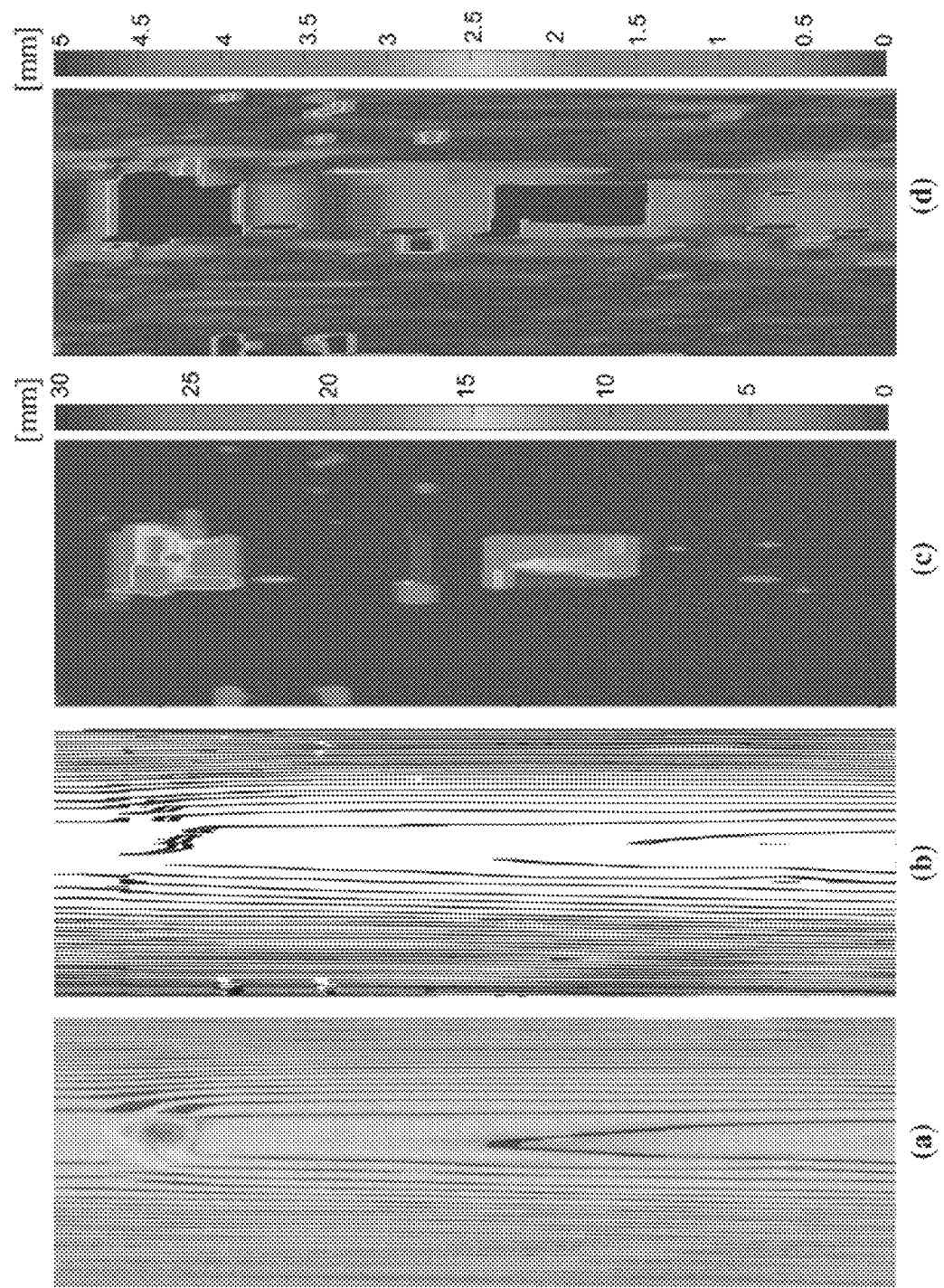
Figure 8:
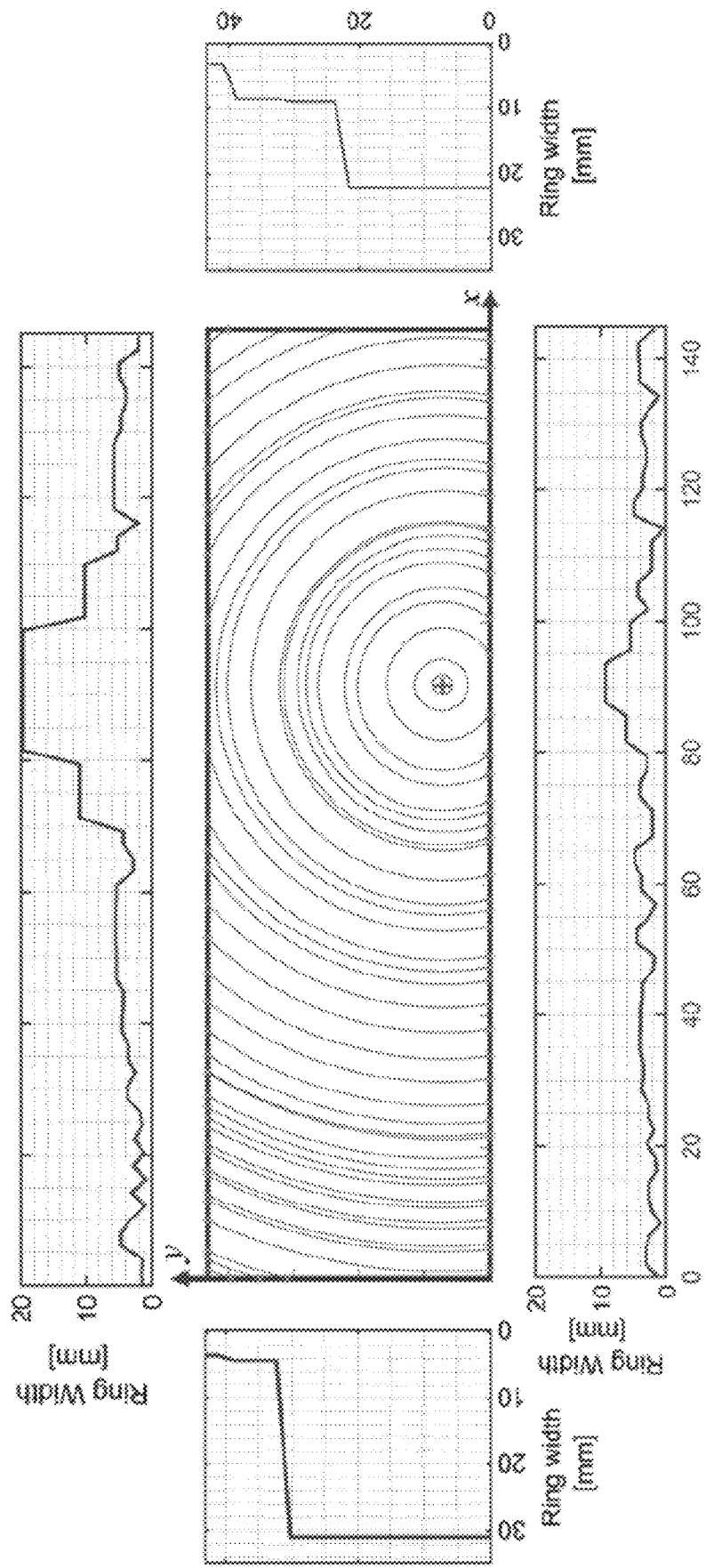
Figure 9:
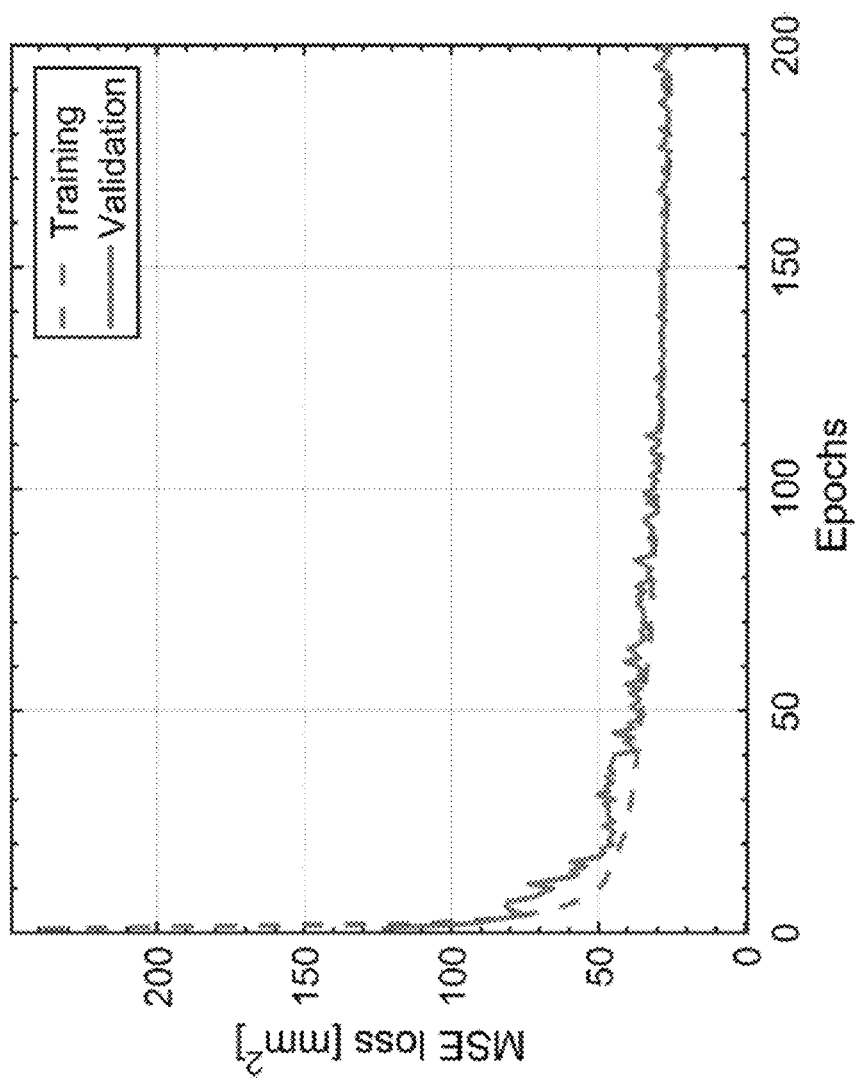
Figure 10:
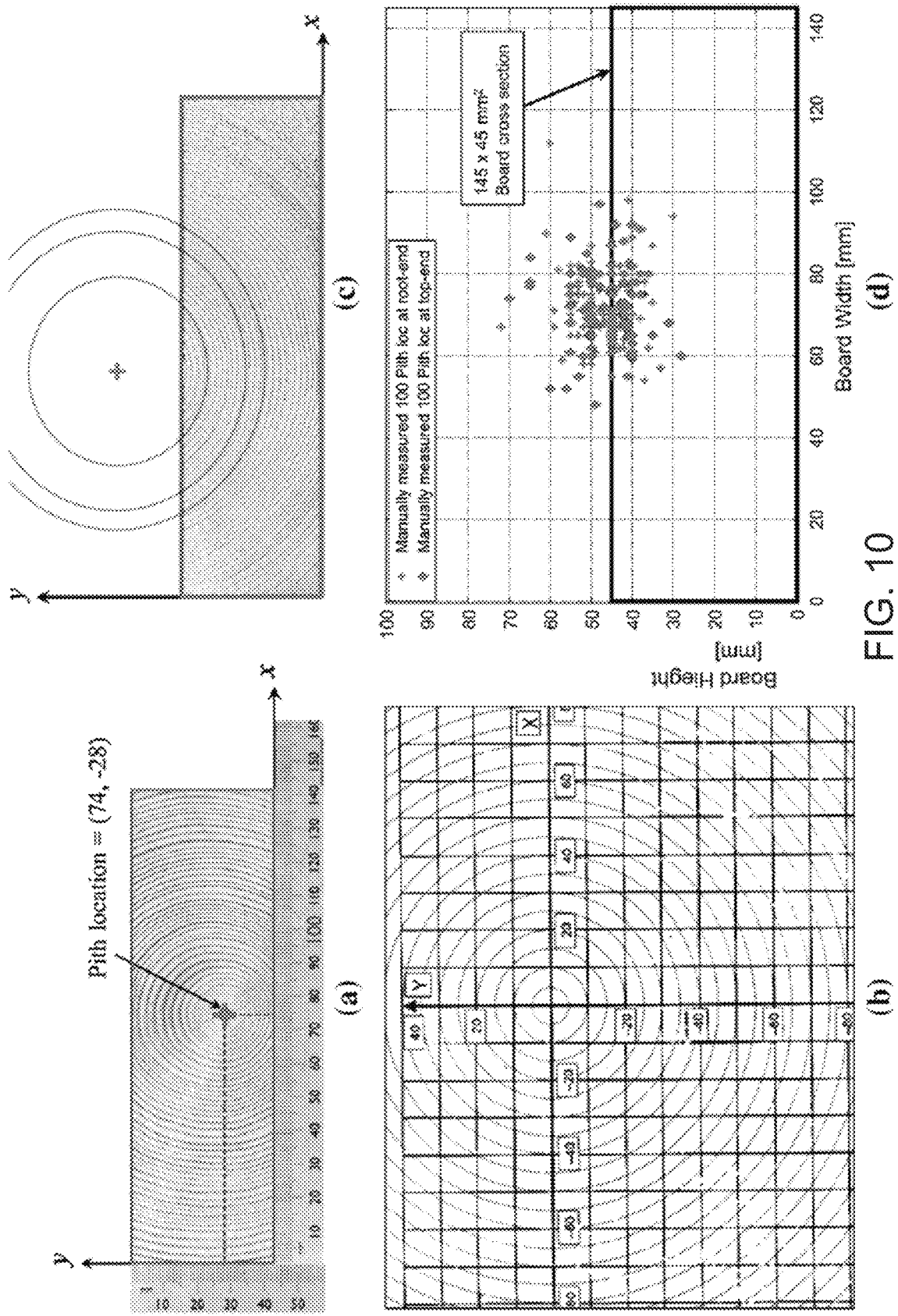
Figure 11:
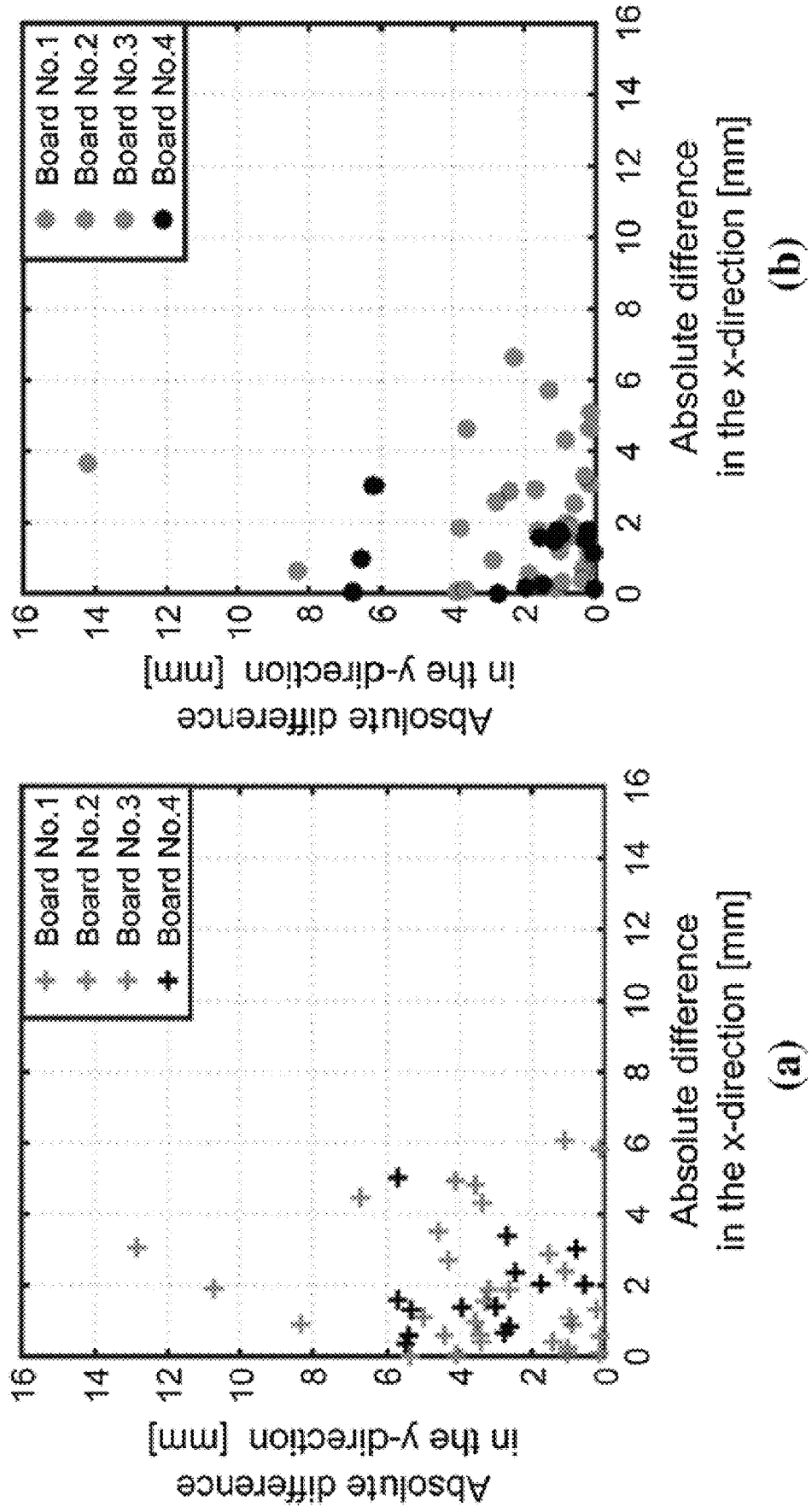
Figure 12A:
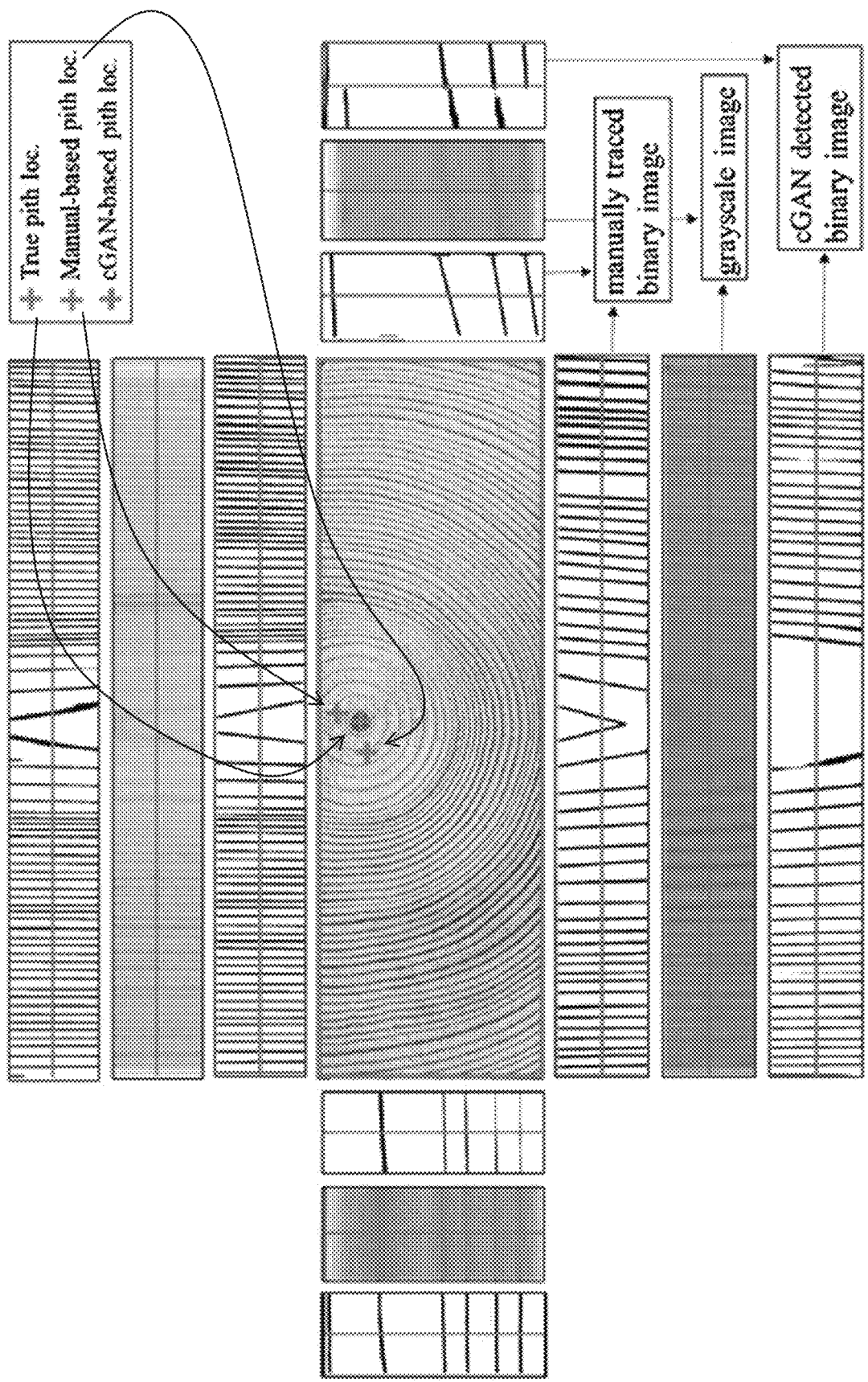
Figure 12B:
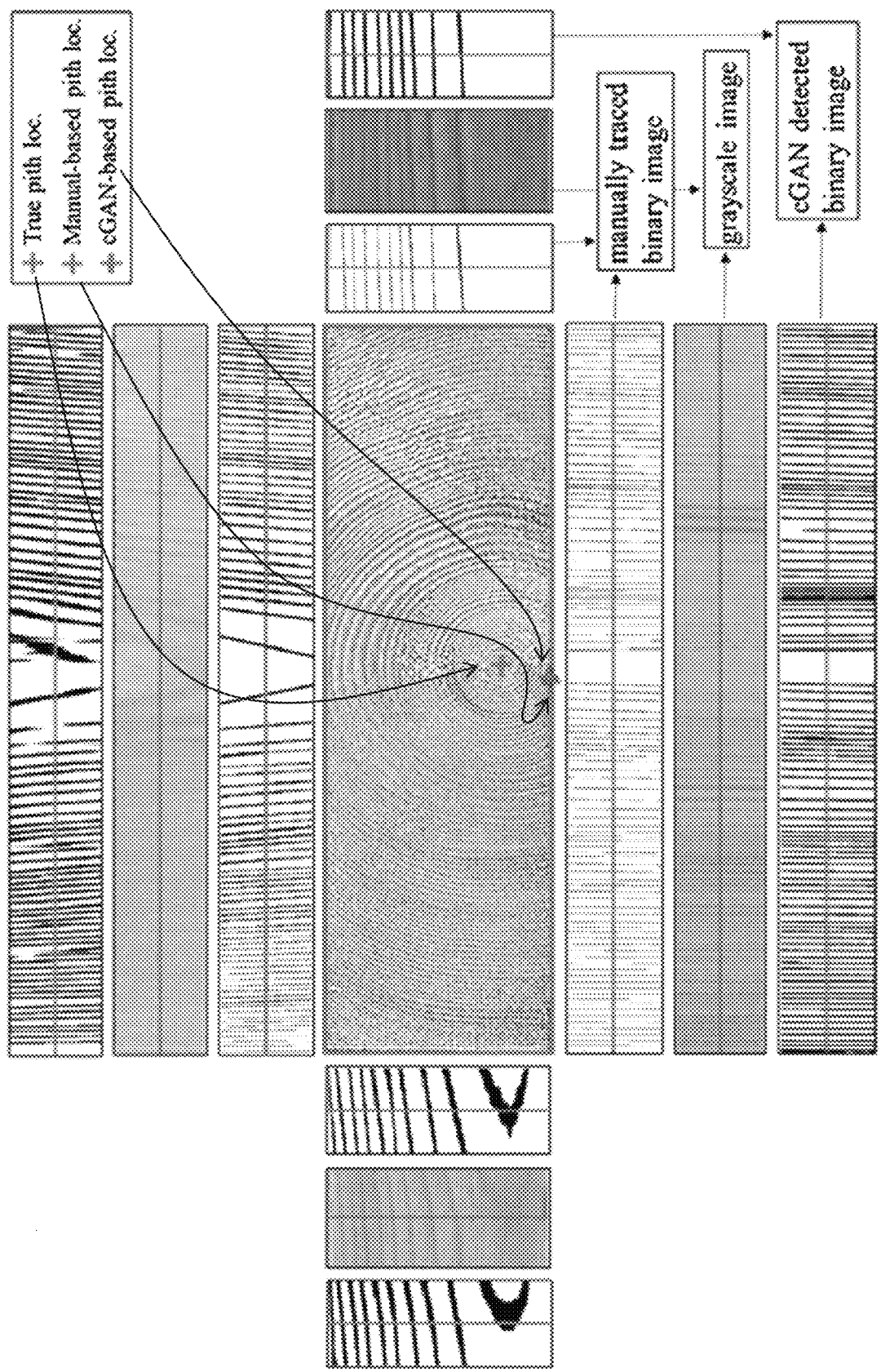
Figure 13:
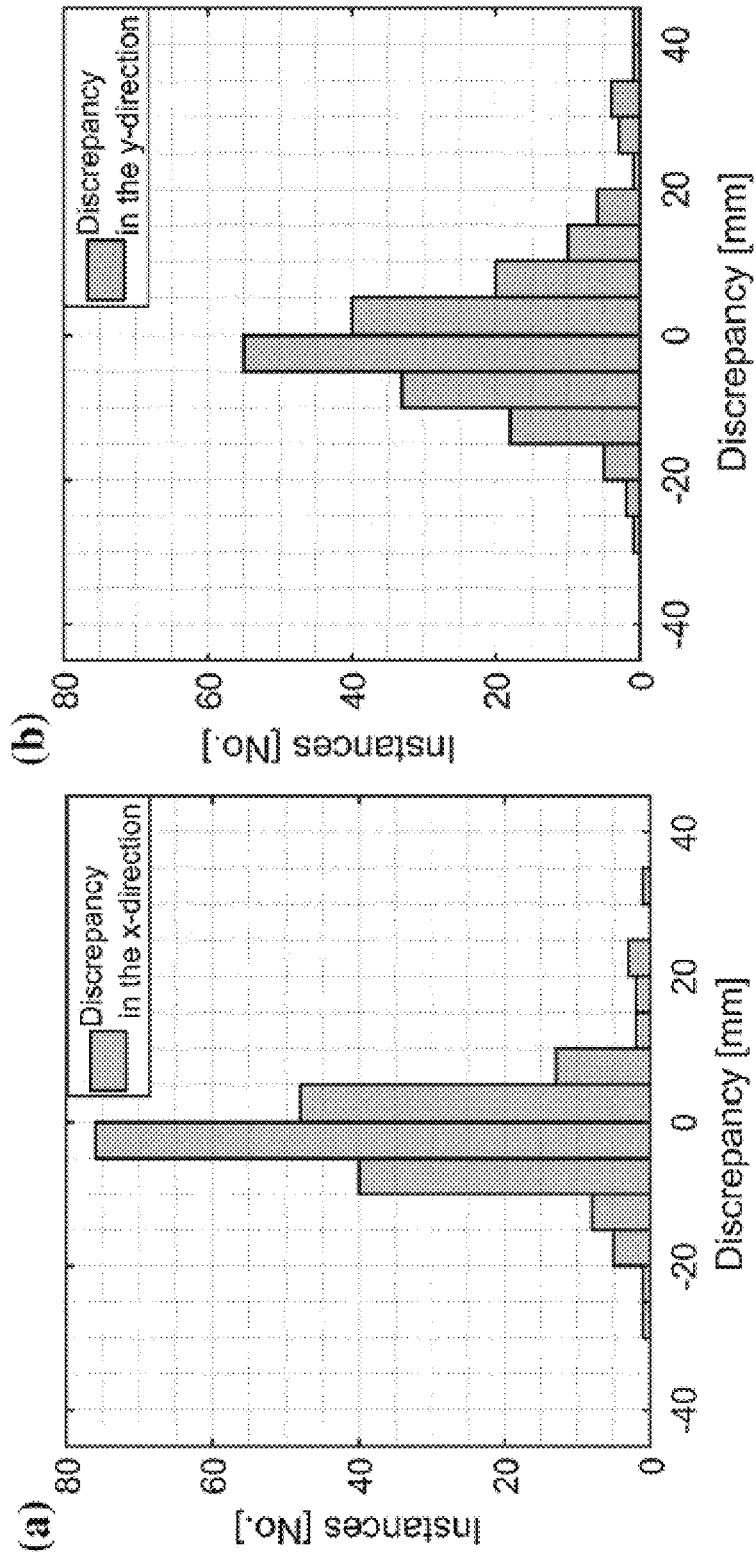
Figure 14:
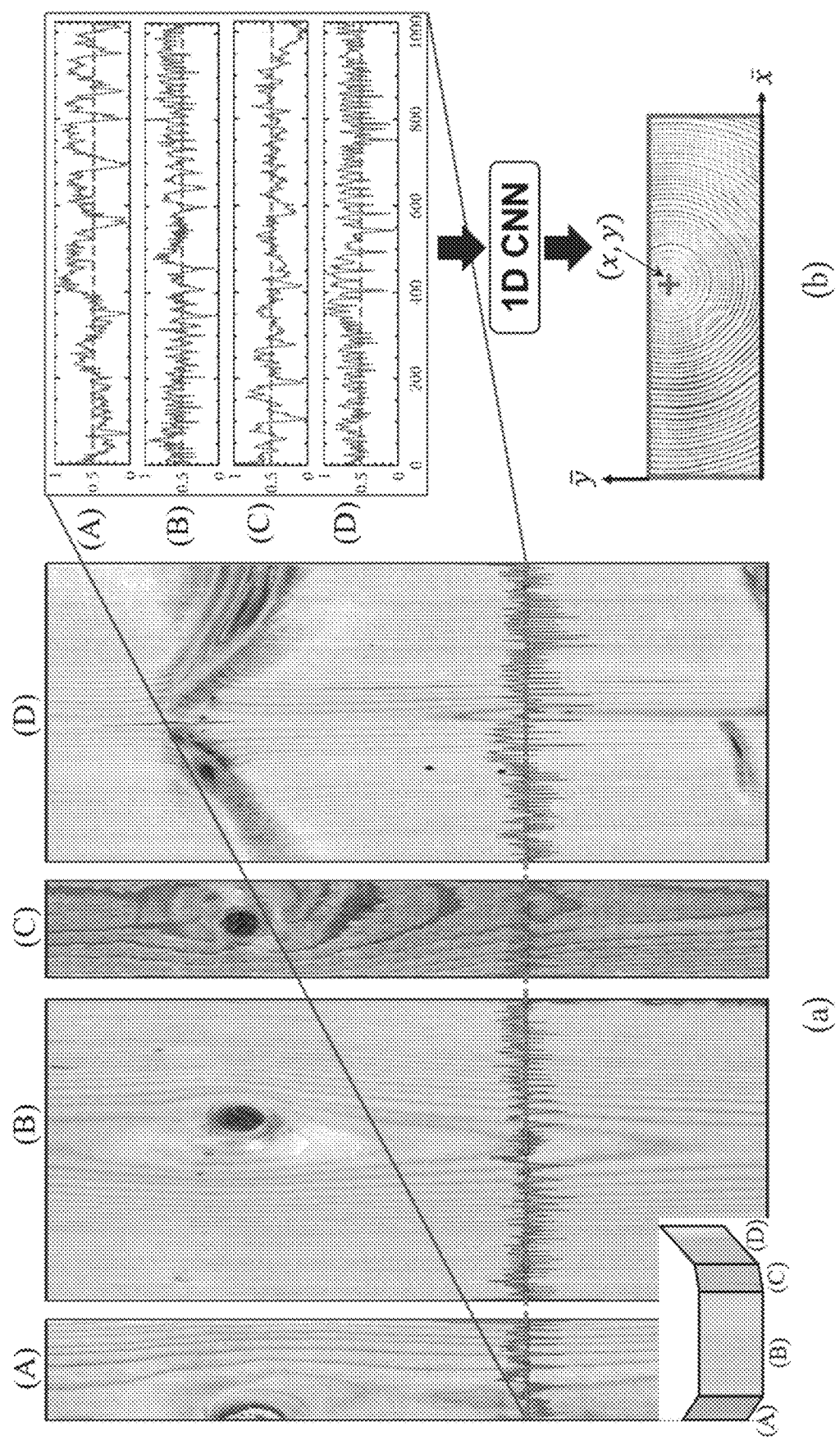
Figure 15:
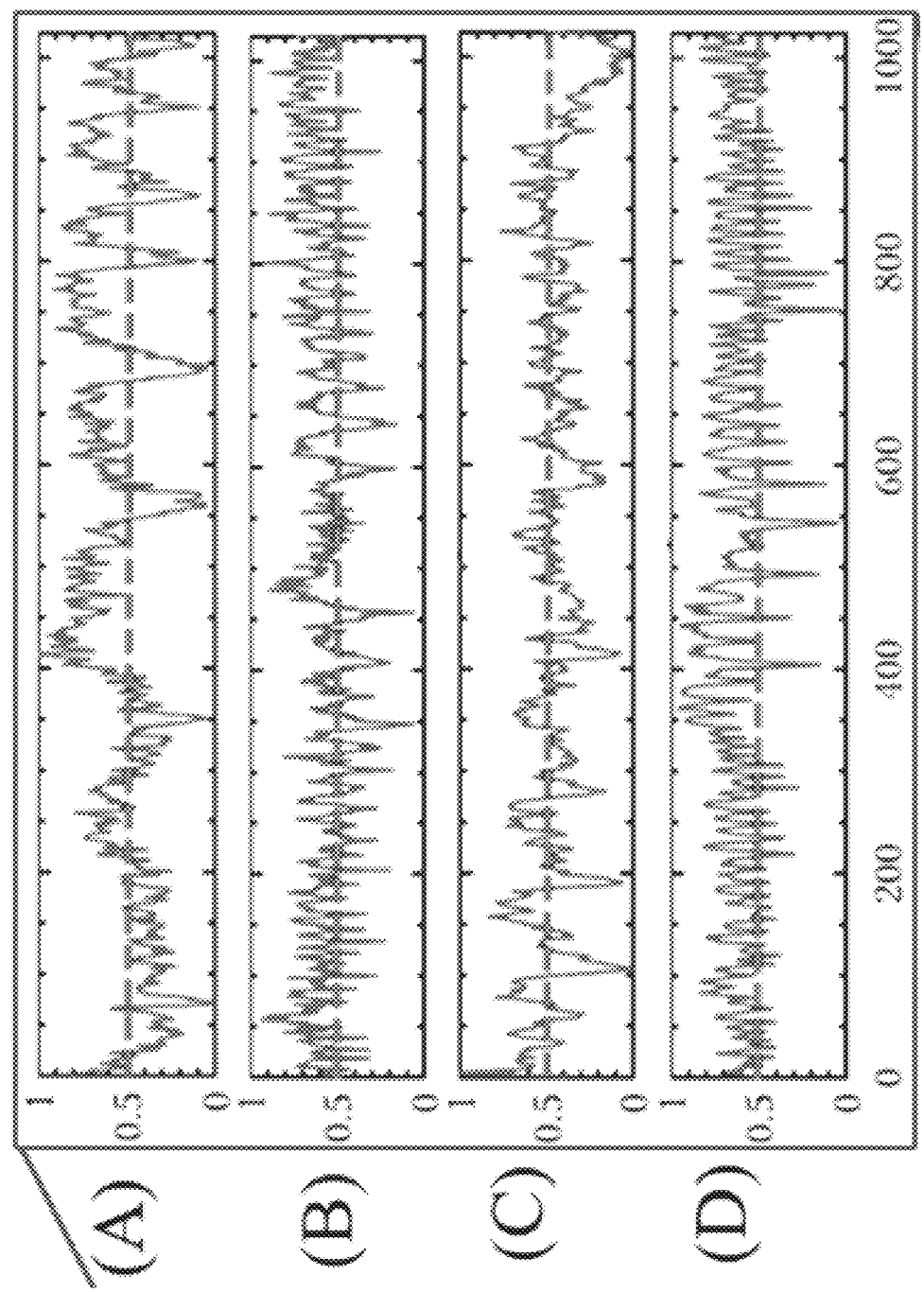
Figure 16:
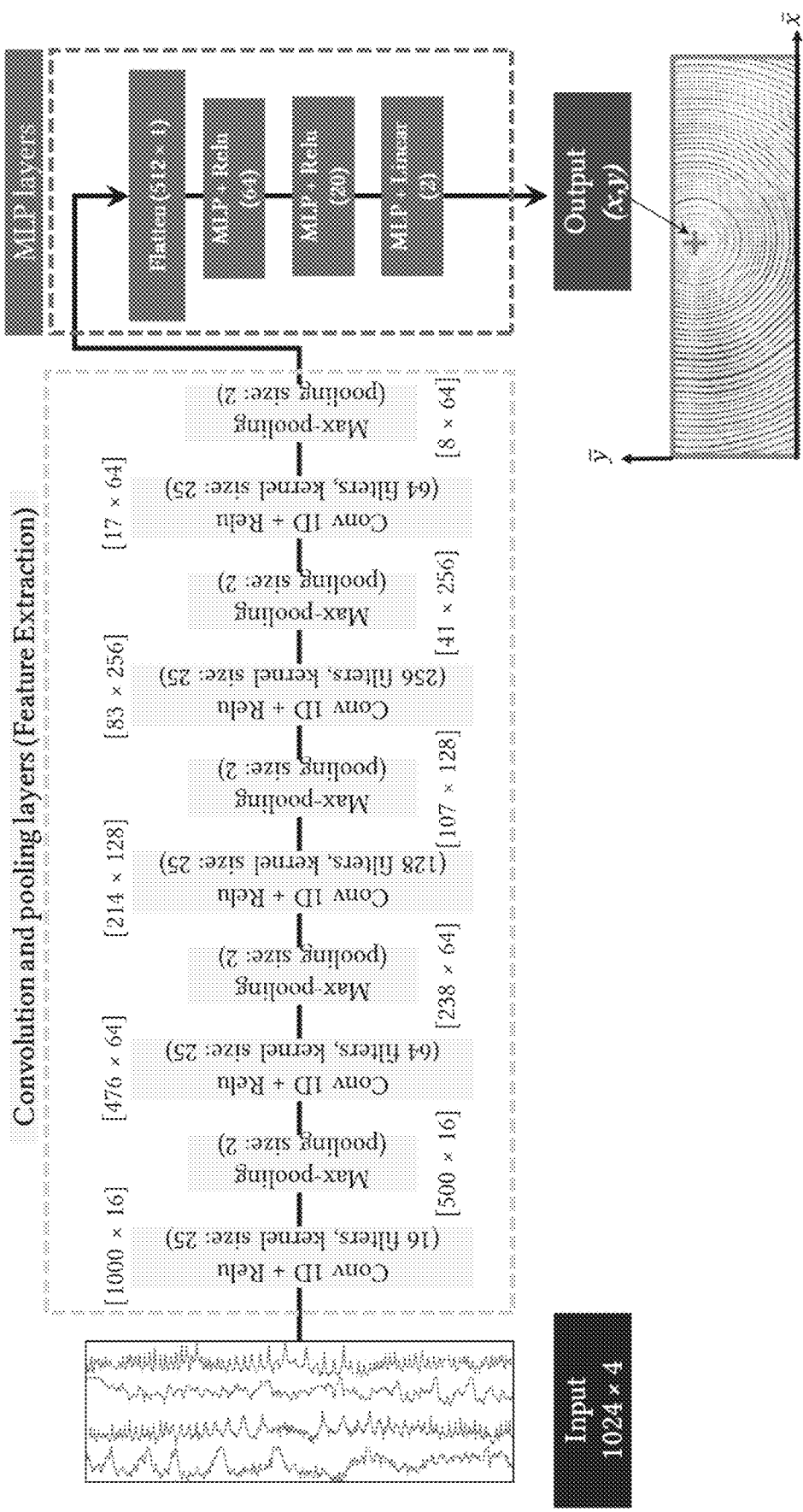
Figure 17:
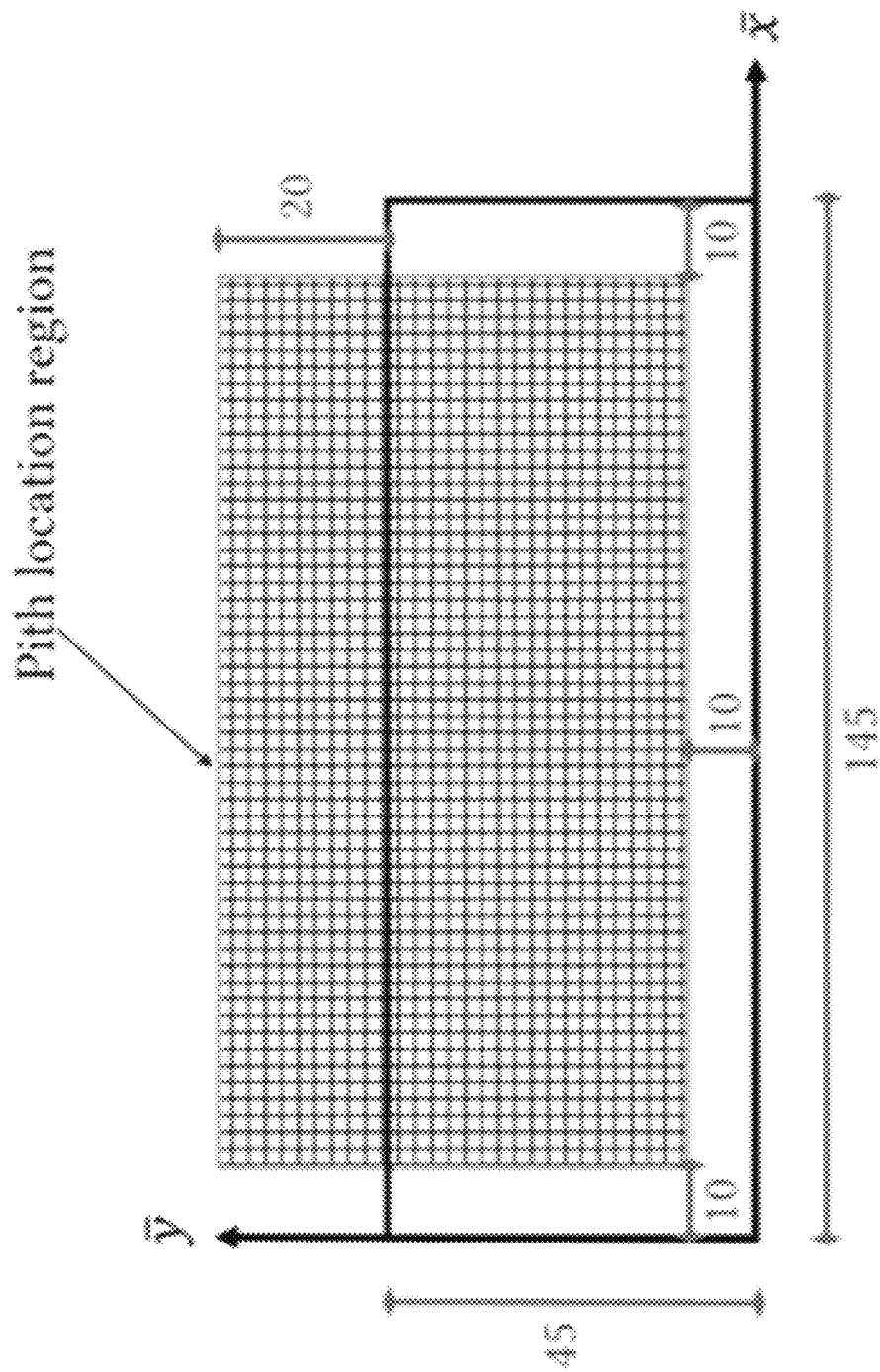
Figure 18:
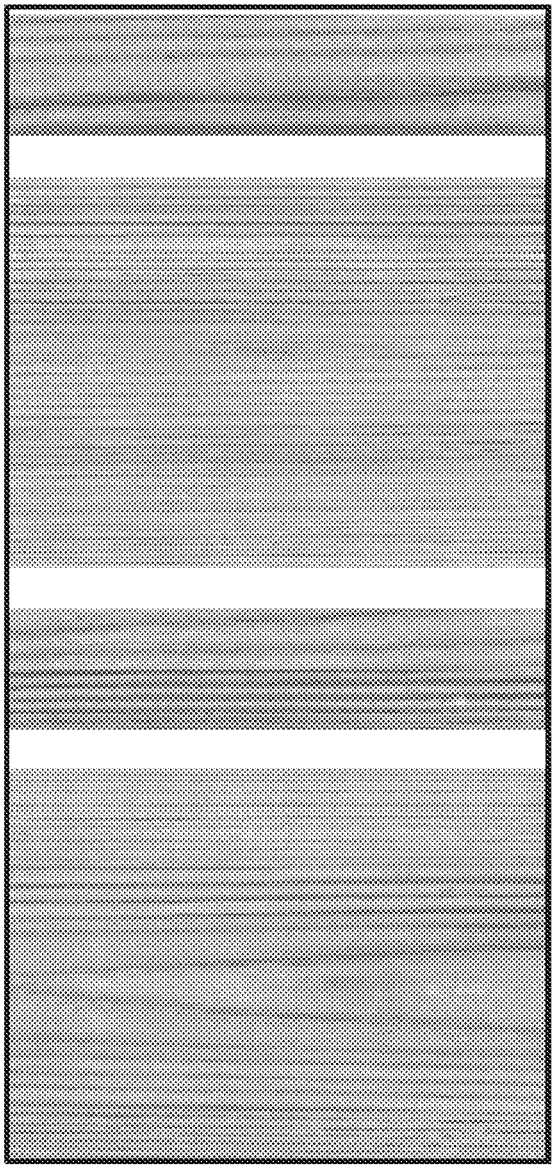
Figure 18:
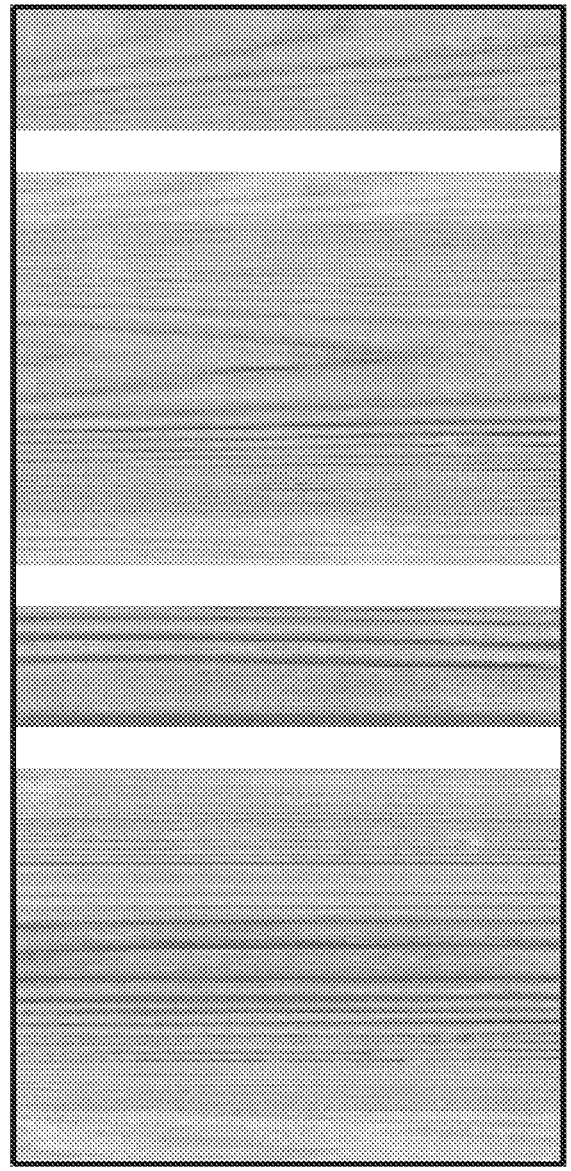
Figure 19:
Figure 19:
Figure 20:
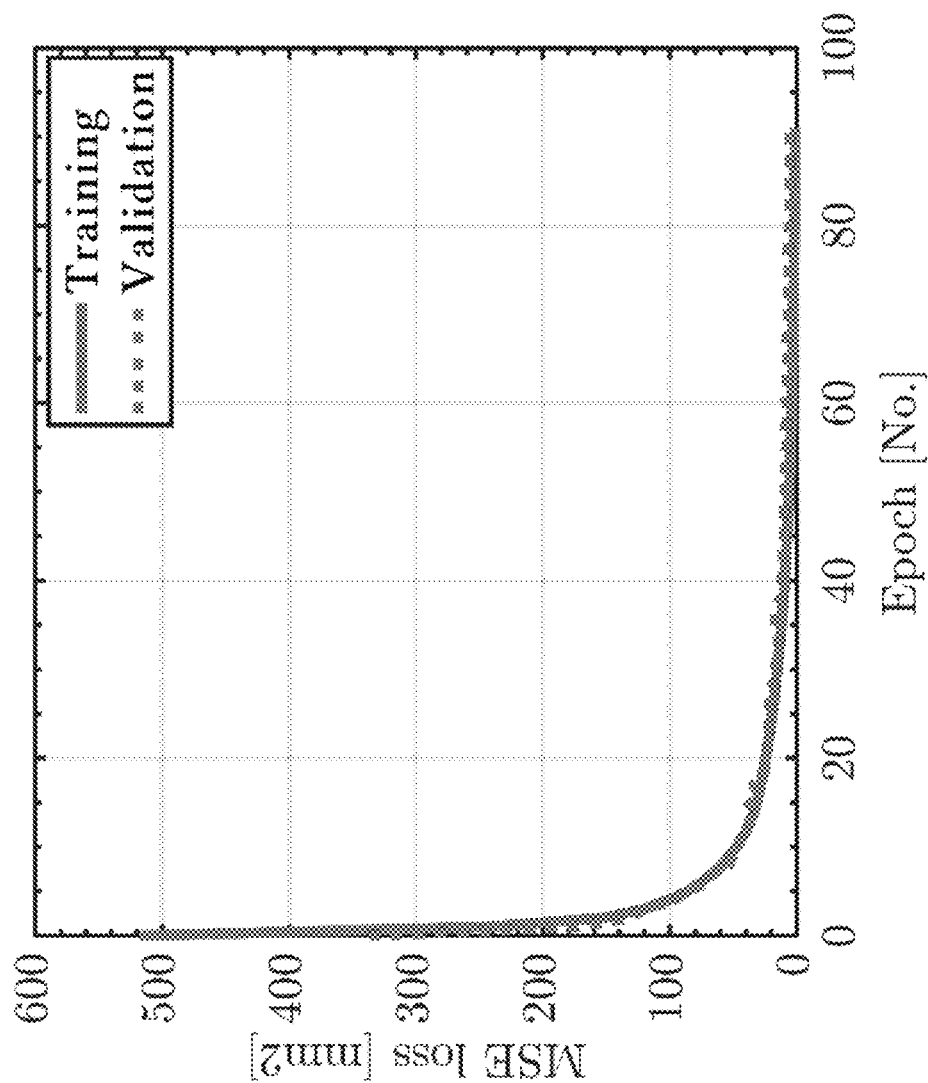
Figure 21:
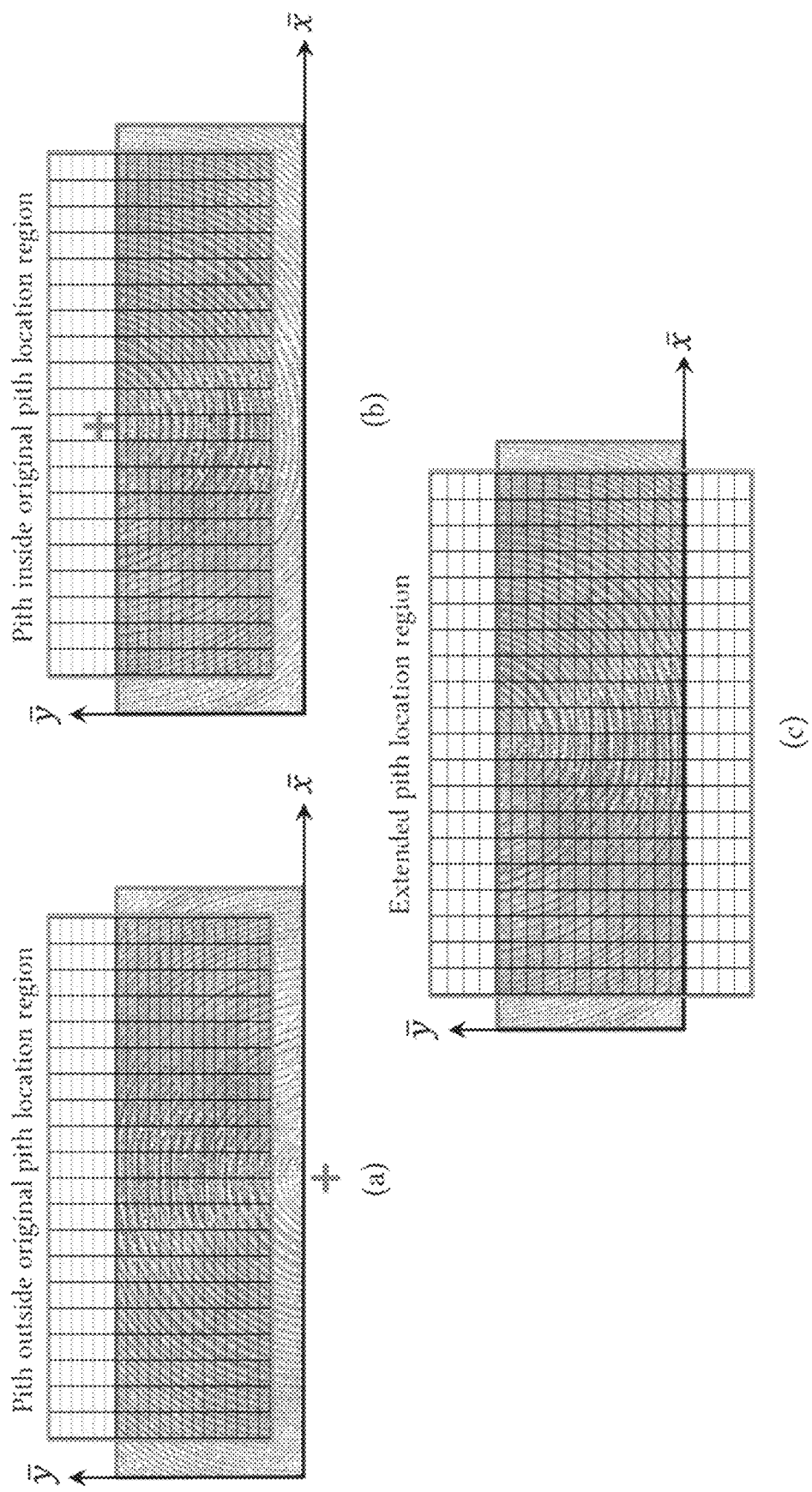
Figure 22C:
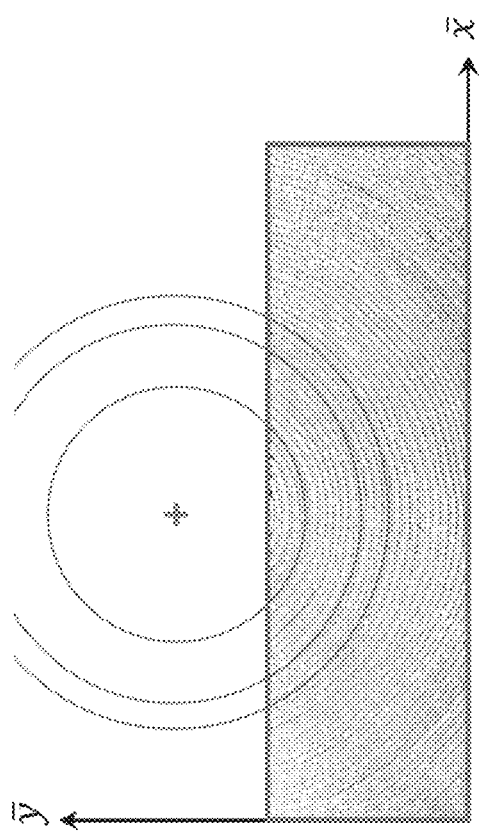
Figure 22A:
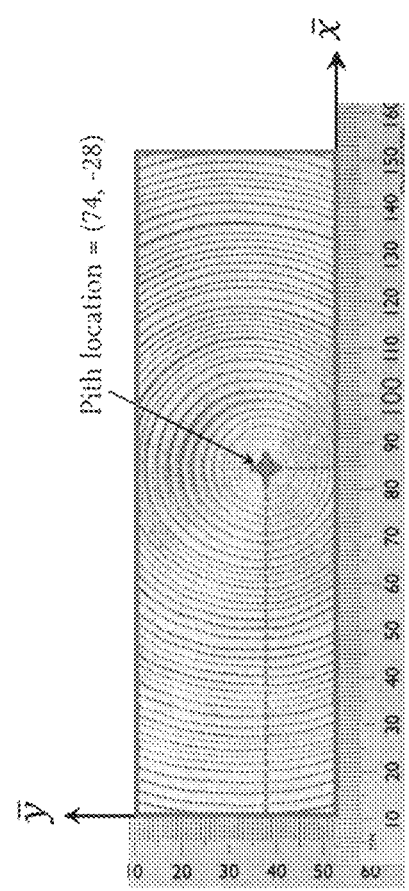
Figure 22B:
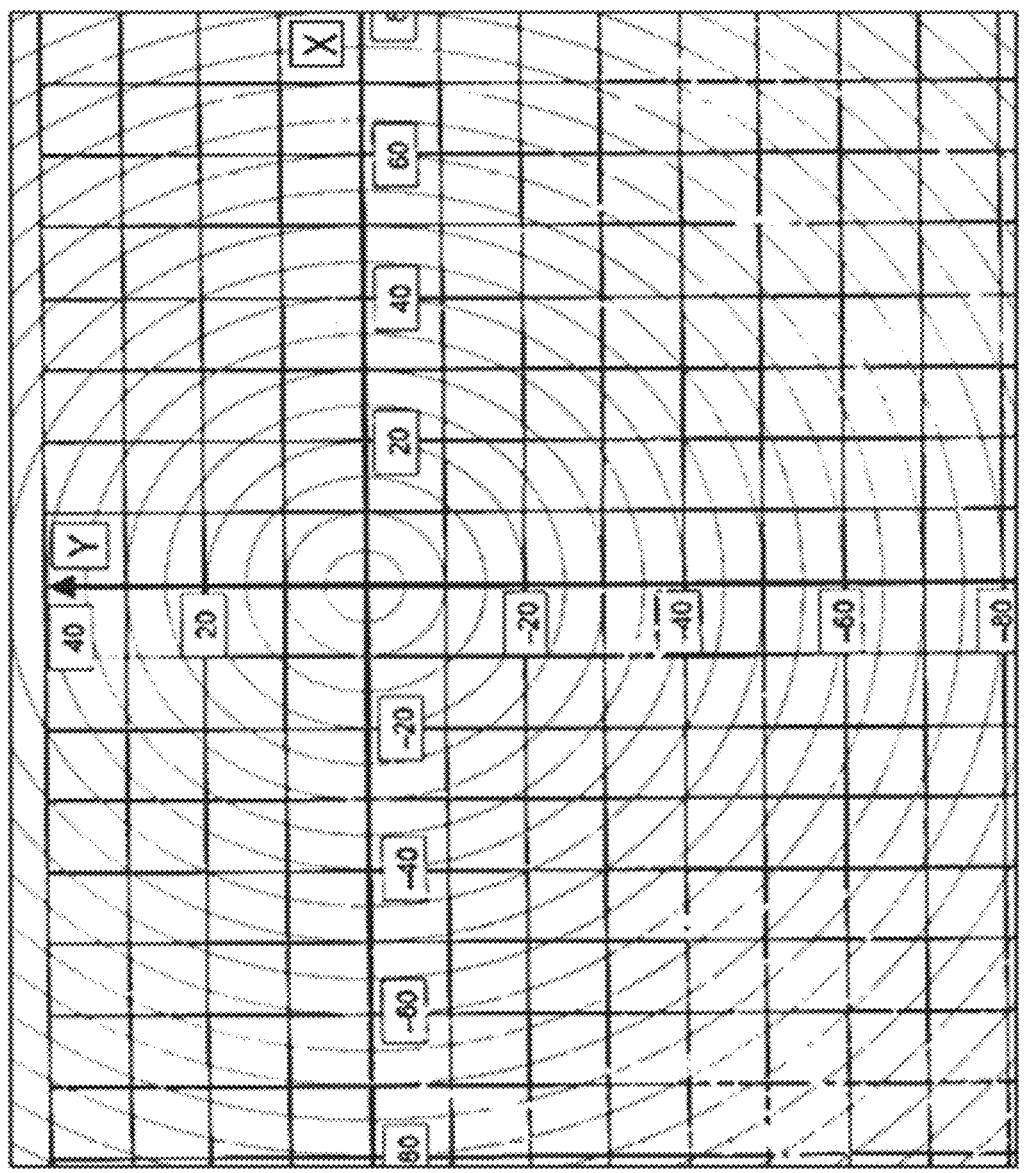
Figure 22D:
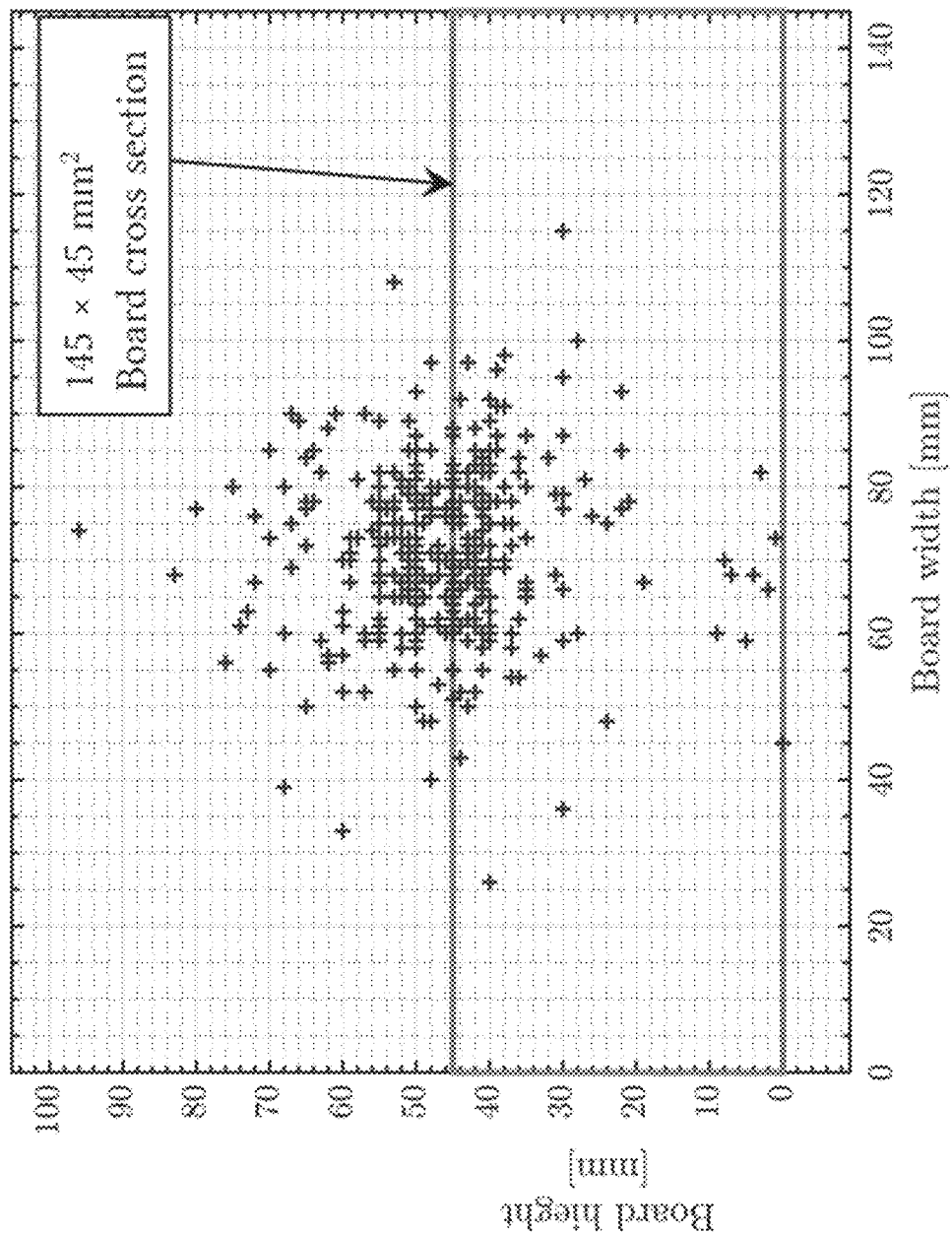

FIG. 4*a* illustrates a single discriminator training iteration of a Pix2Pix cGAN;

FIG. 4*b* illustrates a single generator training iteration of a Pix2Pix cGAN;

FIG. 5 shows some examples of input-target pairs of training data sets used in Example 1: part (a) with no augmentation applied and part (b) with two different augmentation techniques applied, namely 90° rotation (left) and 50% horizontal shrinking (right);

FIG. 6 refers to Example 1 and shows: (a) manually traced rings plotted over the image of part of a board; (b) cGAN-detected surface growth rings; (c) zoomed-in RGB image of part of a board (reproduced in grayscale); (d) zoomed-in image of cGAN-detected surface growth rings; and (e) annual ring width distribution for manually traced and cGAN-detected annual rings;

FIG. 7 refers to Example 1 and shows: (a) manually traced rings drawn on top of the RGB image of part of a board; (b) cGAN-detected surface growth rings; (c) local cGAN surface error with a range of 0-30 mm; and (d) local cGAN surface error with a range of 0-5 mm;

FIG. 8 represents an artificially generated board cross section, the corresponding annual ring width distributions on the four sides and the orthogonal coordinate system used in Example 1;

FIG. 9 is a graphic presenting training performance measures as MSE, with respect to Example 1;

FIG. 10 refers to Example 1 and illustrates the manual detection of a pith location; (a) measurement of pith location for subset 1; (b) plastic sheet applied to pith location of boards of subset 2; (c) concentric circles fitted to annual rings; (d) scatter plot of the manually determined pith location for subset 2;

FIG. 11 refers to Example 1 and graphically illustrates the absolute difference between manually and algorithmically determined pith locations for boards of subset 1 where (a) cGAN and (b) manual tracing are used to identify annual rings in the algorithmic determination;

FIG. 12*a* shows the clear wood section where the highest absolute difference between the cGAN- and manual-based pith location estimation has been recorded in Example 1;

FIG. 12*b* shows the clear wood section where the lowest absolute difference between the cGAN- and manual-based pith location estimation has been recorded in Example 1;

FIG. 13 presents histograms showing discrepancy between manually and automatically determined pith locations for board end sections of subset 2 of Example 1: (a) in the x-direction and (b) in the y-direction;

FIG. 14 represents the general work flow of the algorithm disclosed in Example 2: (a) grayscale images of part of a board with a certain clear wood section marked by a dashed line running across the four sides of the board and the corresponding light intensity signals at this section; (b) the normalised and resampled input light intensity signals of the four sides of the marked section together with an ideal output pith location indicated on the board cross section;

FIG. 15 is an enlarged view of the graphs of FIG. 14;

FIG. 16 represents the network architecture of the 1D CNN used in Example 2 to locate the pith;

FIG. 17 illustrates a board cross section of a virtual board according to Example 2 (marked by solid lines), and the pith location region, marked by a grid, within which the pith can be located;

FIGS. 18 and 19 each represents photorealistic surface images of two different virtual boards produced to train the artificial neural network of Example 2;

FIG. 20 graphically represents training and validation performance of the 1D CNN disclosed in Example 2;

FIG. 21 refers to Example 2 and shows: (a) a board with pith outside the original pith location region; (b) a flipped board with pith now inside the pith location region; (c) a board and extended pith location region;

FIG. 22a refers to manual detection of pith in Example 2 and shows measurement of pith location for subset one;

FIG. 22b refers to manual detection of pith in Example 2 and shows a plastic sheet applied for pith location of boards of subset two;

FIG. 22c refers to manual detection of pith in Example 2 and shows concentric circles fitted to annual rings;

FIG. 22d refers to manual detection of pith in Example 2 and shows scatter plot of the manually determined pith location for subset two;

The present invention relates both to a computer-implemented method for estimating a pith location with regard to a timber board, and to a computer system configured to implement the method.

The computer system comprises one or more processors and a non-transitory computer readable storage medium. The non-transitory computer readable storage medium, which is also part of the invention as such, stores one or more programs configured to be executed by the one or more processors. The one or more programs comprises instructions that, when executed by the one or more processors, cause the computer system to carry out the computer-implemented method for estimating a pith location with regard to a timber board, according to the invention and described in detail in the following.

A timber board on which the present invention can be applied, develops along a longitudinal axis and comprises two end faces, transversal to the longitudinal axis, and four lateral faces developing along the longitudinal axis of the board (at least mainly parallel to it). In the greatest part of cases, the lateral faces comprise two wide lateral faces on two opposite sides, and two narrow lateral faces on the other two opposite sides. Wide lateral faces are larger that the narrow lateral faces and transversal to narrow lateral faces.

The computer implemented method of the invention includes different steps to be executed one after the other.

First of all, the method includes a step of receiving a pixelated actual digital image of each lateral face of at least a longitudinal part of the timber board. Preferably, pixelated actual digital images obtained from optical scanning are raw RGB images of board surfaces without application of any image pre-processing.

According to the invention, the longitudinal part is a segment of the timber board which extends along the longitudinal axis. Depending on the embodiments, the longitudinal part can correspond to the whole timber board or only to a part thereof.

The method then comprises the step of identifying an input portion in said longitudinal part of the timber board. The input portion can correspond to the whole longitudinal part of the timber board, or only to a part thereof depending on the embodiments and the characteristics of the timber board.

According to the invention, in fact, the input portion is chosen as a longitudinal portion of the timber board which is delimited by two transversal cross-sections spaced apart along the longitudinal axis. In other words, the input portion is a segment of the timber board.

In some embodiments the input portion is chosen as portion of the timber board which comprises knot-free clear wood at each of its lateral faces. In the preferred embodiment, a piece of wood surface is classified as knot-free clear wood when within such a piece of wood surface, in-plane wood fibre directions are substantially parallel to the longitudinal axis. In accordance with the present invention, a direction is considered substantially parallel to the longitudinal axis when the smaller angle between them (in the following simply referred to as "the angle") does not exceed a predefined limit value which at maximum can be equal up to 20°, but which preferably is equal to 12°.

Moreover, in the preferred embodiment, the input portion is a segment of the timber board having a given length (measured along the longitudinal axis) across all the four sides (lateral faces).

In some embodiments, such a segment is mainly made of knot-free clear wood. According to the invention, a segment is considered mainly made of knot-free clear wood when on its lateral faces, considered as a whole, the percentage of in-plane fibre directions which have an angle with respect to the longitudinal axis of the board which exceed the predefined limit value, does not exceed a predefined maximum value which in some embodiments can be equal to 20%, but which in the preferred embodiment is equal to 10%.

In some embodiments, the input portion is defined only as the central part, or the centre, of the above disclosed segment of the timber board having the given length.

In the preferred embodiment, the input portion is identified by means of a surface laser scanning and a tracheid effect detection, applied to timber boards lateral faces, as described in more detail in the following. Other techniques can however be used, for example an identification based on the pixelated actual digital images.

Once the input portion has been identified in the longitudinal part of the timber board, the method according to the invention comprises a step of extracting from each pixelated actual digital image of the longitudinal part of the timber board, an input image representing the input portion. Four input images are then obtained for each input portion. Advantageously, the input image is then the part of the pixelated actual digital image in which only the whole lateral face of the input portion can be seen. The four input images globally represent the appearance of the input portion at each of its lateral faces.

The next step of the method is a step of inputting said four input images into the input layer of an artificial neural network (ANN) and making the artificial neural network operate.

As known, artificial neural networks (ANNs) are machine learning models that are loosely based on the framework of neurons in human's central nervous system. A typical ANN consists of nonlinear processing units, called artificial neurons, arranged in layers and interconnected by a number of connections. As any other machine learning method, ANNs learn the required knowledge from a given training data set. The learned experience is stored in the connections between the ANN's neurons.

The artificial neural network used according to the invention is trained to elaborate the four input images to produce output data which define a location of the pith of the log from which the timber board has been obtained. The location of the pith is defined in a plane perpendicular to the longitudinal axis of the timber board located at the input portion.

The final step is then that of reading said output data at an output layer of the artificial neural network and providing the output data as the estimation of the pith location.

In the context of the present invention, two major exemplary embodiments of the artificial neural network have been deployed.

According to a first embodiment, the artificial neural network comprises a single artificial neural infrastructure trained to output the output data when receiving the input images as input data. Advantageously, the single artificial neural infrastructure can be a one-dimensional convolutional neural network (1D CNN) as described for example in detail in the Example 2 which follows. In other embodiments, however, the single artificial neural infrastructure can be a two-dimensional convolutional neural network (2D CNN). Using a 2D CNN can allow the artificial neural network to elaborate the output data also on the basis of local fibre directions.

According to a second embodiment, the artificial neural network comprises a first artificial neural infrastructure and a second artificial neural infrastructure which are configured to be operated one after the other.

The first artificial neural infrastructure defines the input layer to which input images are supplied, and is trained to output intermediate data which are then used as input data for the second artificial neural infrastructure.

The first artificial neural infrastructure is trained to estimate the position of individual growth rings in the input images. Intermediate data identify the position of individual growth rings in each of the input images. Once generated, intermediate data can be provided as an additional output of the network, if needed.

The second artificial neural infrastructure is trained to use the intermediate data to output the output data which define the location of a pith of the log from which the timber board has been obtained.

In a preferred embodiment, the first artificial neural infrastructure comprises one or more conditional generative adversarial networks (cGANs) as described for example in detail in Example 1 which follows.

In a preferred embodiment, the second artificial neural infrastructure comprises one or more multilayer perceptron (MLP) networks as described in detail in Example 1 which follows.

In one embodiment, the first artificial neural infrastructure comprises a first conditional generative adversarial network (cGAN) and a second conditional generative adversarial network (cGAN). The first conditional generative adversarial network (cGAN) is trained to use, as input data, input images representing the appearance of the input portion at each of wide lateral faces of the timber board. The second conditional generative adversarial network (cGAN) is trained to use, as input data, input images representing the appearance of the input portion at each narrow lateral face of the timber board.

Example 1 below, refers to a case in which the first artificial neural infrastructure comprises the two conditional generative adversarial networks (cGANs), and the second artificial neural infrastructure comprises one multilayer perceptron (MLP) network.

In the preferred embodiments of the present invention, each input image is a greyscale image.

In some embodiments each input image comprises one or more channels of a RGB image. In some case, one or more channels of the RGB image are used to create the greyscale image.

In some embodiments, the four input images are inputted to the artificial neural network as separated images.

In some embodiment, the four input images are first combined in a single image and then inputted to the artificial neural network. In particular, starting from a first input image, other input images can be joined one after the other at their common edges to substantially "unfold" the lateral surface of the input portion. A typical combined single image can be formed by the succession of an input image corresponding to a wide face (or respectively a narrow face), the input image corresponding to the adjacent narrow (or respectively wide face), the input image corresponding to the other wide face (or respectively the other narrow face) and the input image corresponding to the other narrow face (or respectively the other wide face). In some preferred embodiments, the input portion is chosen as a slice of the timber board perpendicular to the longitudinal axis. In particular, such a slice can be very thin and can have a thickness (measured along the longitudinal axis) such that each corresponding input image is a one-dimensional image, that is an image constituted by a single row of pixels (the thickness of the slice substantially corresponds to the width of a pixel). In this case, the four input images, when considered together, substantially represent the appearance of the surface of the timber board along a line corresponding to the intersection between a plane perpendicular to the longitudinal axis and each lateral face of the timber board (such intersection being the input portion).

The method as described here above allows to estimate the pith location at any longitudinal position of the timber board which is located in an input portion.

In some embodiments, the method as described is executed a plurality of times for the same timber board to estimate pith location at a plurality of different positions along the longitudinal axis of the timber board. That can be done either by using a plurality of different input images extracted from the same pixelated actual digital images of one longitudinal part of the timber board, or by using pixelated actual digital images of different longitudinal parts of the timber board, of both.

Moreover, in some embodiments, the method further comprises a step of estimating the pith location at cross-sections of the timber board other than said input portions; those pith positions are estimated by interpolation between the pith locations determined at adjacent input portions (preferably axially adjacent on both sides).

As anticipated above, in the preferred embodiment, the input portion is identified by means of a surface laser scanning of timber boards lateral faces, combined with the so-called tracheid effect detection.

In some embodiments, the identification of the input portion comprises scanning the surface of each lateral face of the part of the timber board to which pixelated actual digital images refer, with a structured laser light, acquiring images of laser lighted points of the surface and detecting local fibre directions as functions of propagation of light on the surface around the laser lighted points. As known, in fact, when a concentrated light source illuminates a wood surface, parts of the light will scatter into the cell structure and this scattered light will transmit more in the direction parallel to the fibres (tracheids) than in perpendicular direction (see [24] and [28] Soest J, Matthews P, Wilson B (1993) *A simple optical scanner for grain defects. In: Fifth international conference on scanning technology and process control for the wood products industry*, October, Atlanta, Georgia, pp 25-27).

In the following, the set of all in-plane wood fibre directions so determined for the input portion, will be referred to as fibre data.

Fibre data so obtained are then used to determine an angle formed by each in-plane wood fibre directions with the longitudinal axis.

The method then comprises the step of classifying as knot-free clear wood area, any area of each lateral face, in which the determined angle of in-plane wood fibre direction is no more than 20°, preferably no more than 12°; the resolution that can be used in the identifying these knot-free clear wood areas is the same as in the tracheid effect detection.

Finally, once the knot-free clear wood areas in the longitudinal part of the timber have been identified, the method comprises the step of identifying the input portion (if any).

In a preferred embodiment, accordingly, a portion of said longitudinal part is identified as the input portion if it has a longitudinal length at least equal to 5 mm, preferably at least equal to 10 mm, and if no more than 20%, preferably no more than 10%, of the areas of its lateral faces in which the angle of in-plane wood fibre direction has been determined, has not been classified as knot-free clear wood area.

It is also part of the present invention an apparatus for automated assessment of timber board comprising a computer system having one or more processors and a non-transitory computer readable storage medium as described above. The apparatus can further comprise a plurality of cameras configured to acquire said pixelated actual digital images of each lateral face of at least a longitudinal part of the timber board and to provide them to the computer system. Moreover the apparatus can comprise a laser scanner and a tracheid effect detector, both configured to execute the above-described surface laser scanning and the tracheid effect detection.

Two implementation examples of the present invention will be described here below.

A—Example 1

The scope of Example 1 was limited to applications to knot-free clear wood cross sections of planed Norway spruce timber boards.

In this example, it has been developed an artificial neural network comprising a first artificial neural infrastructure including two conditional generative adversarial networks (cGANs) trained to estimate the position of individual growth rings in the input images, and a second artificial neural infrastructure comprises one multilayer perceptron (MLP) network trained to estimate pith location using estimated positions of individual growth rings as input data.

A.1—Materials and Data Obtained from Scanning

A total sample of 112 planed Norway spruce timber boards with nominal dimensions of 45×145×4500 mm originating from the areas around the lake Siljan in mid-Sweden and Hamina in south Finland were analysed. Out of the 112 boards, seven boards were used to train and one to validate the algorithm developed for detecting each individual growth ring on the four sides of the board (first artificial neural infrastructure). The remaining 104 boards were used to test the algorithm developed for estimation of pith location on clear wood sections along the boards, after detection of growth rings on surfaces (second artificial neural infrastructure). The sample of 104 boards was further divided into two subsets, consisting of 4 and 100 boards, respectively. The boards in the first subset had the pith located within their cross sections, and these boards were physically available for comparative manual assessment. The boards in the second subset were available in digital form through high-resolution RGB images, in-plane fibre direction information of all the four surfaces obtained from scanning of surfaces, and manually determined pith locations. Regarding the position of pith, the second subset contained boards with pith located both inside and outside their cross sections. The sample of 4+100 boards was identical with the sample used in [12].

The data used to detect annual rings on board surfaces were obtained using an optical industry wood scanner equipped with LED lights, colour cameras, multi-sensor cameras, and line and dot lasers. Data delivered by the scanner consist of red, green and blue (RGB) channel images, and data of local in-plane fibre direction, of all the four sides of the scanned timber board. An approximate pixel size in the RGB images is 0.8×0.07 mm (lengthwise×crosswise resolution), and the resolution of the local in-plane fibre direction data is approximately 1×4.4 mm (lengthwise×crosswise). The resolution of the RGB images is about 2070×5625 and 642×5625 pixels for the wider 145×4500 mm and the narrower 45×4500 mm surfaces, respectively. The in-plane fibre directions were determined by utilising the tracheid effect. All the boards included in this Example had already been dried to 12% MC and examined, manually and by means of an optical scanner, within a previous research project reported in [15], which facilitated the development of the present example. Additional set-up details of the scanner are also provided in [15].

A.2—Artificial Neural Networks

The following subsections provide a brief background on the ANN models used in this example including multilayer perceptrons, convolutional neural networks and conditional generative adversarial networks.

A.2.1—Multilayer Percetrons

Figure 1:
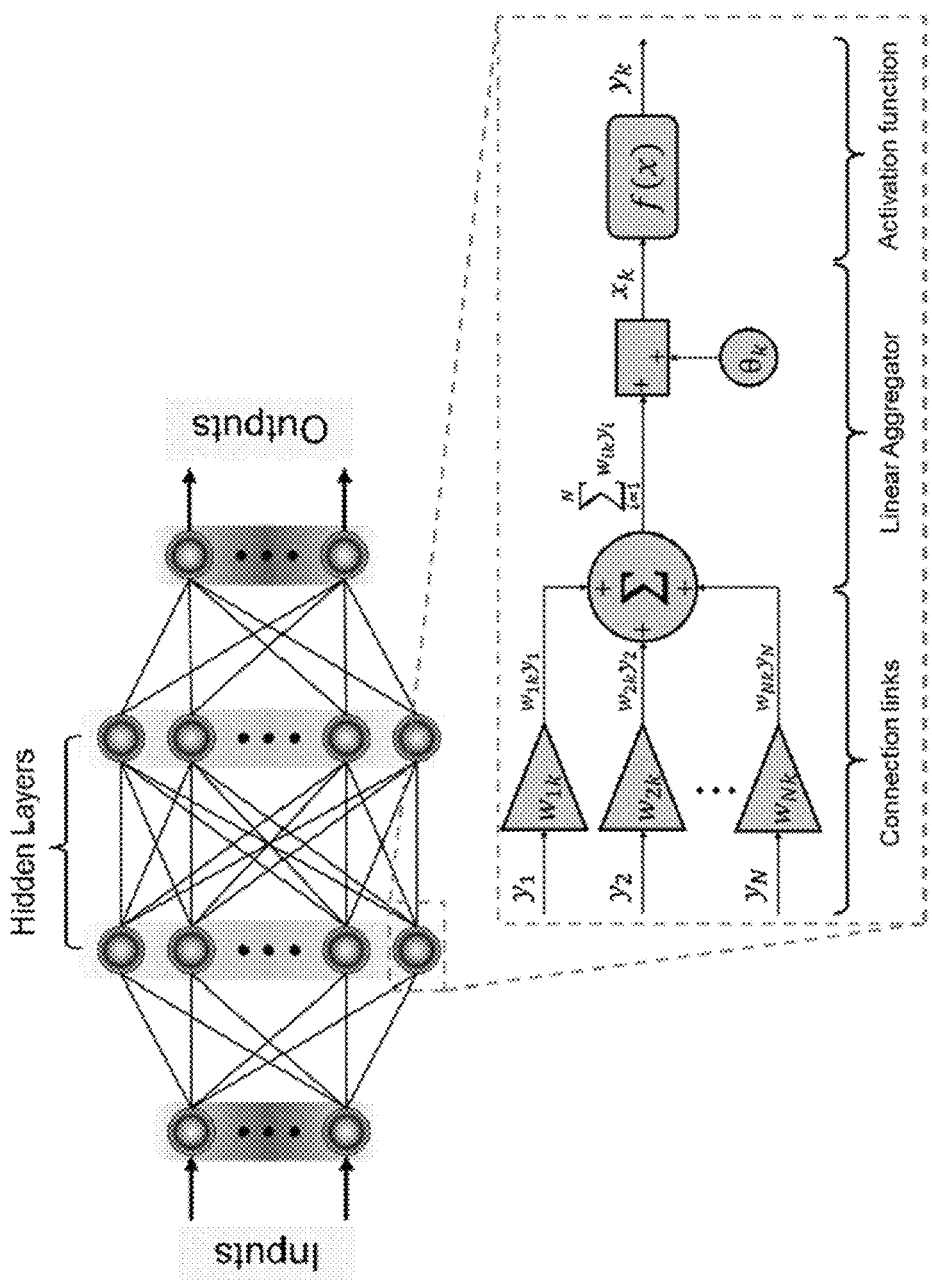
FIG. 1 represent a schematic of a typical MLP (fully connected) neural network showing the components of an MLP neuron.

Multilayer perceptrons (MLPs) are perhaps the most widely used class of ANNs. As illustrated in FIG. 1, MLPs are composed of a number of interconnected MLP neurons arranged in layers. The first layer of an MLP is called the input layer, while the last one is called the output layer. The layers lying between the input and the output layers are referred to as the hidden layers. The number of neurons in the input and output layers is determined by the number of inputs and outputs of the modelled system, respectively. On the other hand, the number of hidden layers in the network along with the number of neurons in each hidden layer is hyperparameters that should be defined by the designer before running the training process.

MLPs fall in the category of multilayer feedforward ANNs since the inputs are only allowed to propagate in the forward direction. Each neuron in any MLP layer is connected to all neurons in the preceding layer, which is why MLPs are commonly referred to as fully connected networks.

The artificial neurons of an MLP network are nonlinear units composed of the following components ([17] Goodfellow, Yoshua Bengio, Aaron Courville, *Deep Learning, MIT Press*, 2017. doi:10.1561/2000000039):

1. Connection links that connect the neuron to all neurons in the preceding layer. A scalar called the connection weight $w_{ik}$ is assigned to each link, where the subscript i denotes the neuron at the input end of the link, while the subscript k represents the neuron at the receiving end (i.e. the current neuron).
2. A linear aggregator that sums the weighted inputs from the N preceding neurons together with a bias $\theta_k$:

$$x_k = \theta_k + \sum_{i=1}^{N} w_{ik} y_i \quad (1.1)$$

3. An activation function f(.) that processes $x_k$ to produce the final output of the neuron $y_k$:

$$y_k = f(x_k) \quad (1.2)$$

MLPs belong to the class of supervised neural networks, which means that they are trained over a data set (sample) that contains a number of input observations along with the corresponding desired targets. The weights $w_{ik}$ and biases $\theta_k$ are initially assigned with random values. The random ANN parameters are then tuned through a systematic and iterative training process that involves two operations: forward and back-propagation. In forward propagation, an input observation is propagated in the forward direction until the output emerges from the output layer. A certain loss function is then used to compute the error between the actual output of the neural network and the desired target associated with the applied input observation. Mean squared error (MSE) and mean absolute error (MAE) are examples of commonly used loss functions. The computed error is then back-propagated from the output layer through the hidden layers and finally to the input layer. During the back-propagation process, the sensitivity of each weight and bias in the network to the error is obtained. The sensitivities are then used to iteratively update the ANN parameters until a certain stopping criterion is achieved. Several gradient descent (GD) optimisation methods can be used in the training process such as stochastic gradient descent (SGD) presented in [18] (Ruder, S. (2016), *An overview of gradient descent optimization algorithms. arXiv preprint arXiv:*1609.04747) and Adam optimiser in [19] (Kingma, D. P., & Ba, J. (2014). *Adam: A method for stochastic optimization. arXiv preprint arXiv:* 1412.6980). In GD optimisation algorithms, the learning rate controls the size of the step taken at each iteration towards a local minimum of a loss function until convergence ([18]). Therefore, the learning rate is another key hyperparameter in the training process that determines how fast the ANN weights are adjusted with respect to the calculated sensitivities ([17]).

A.2.2—Conditional Generative Adversarial Networks

Convolutional neural networks (CNNs) are another type of ANNs commonly used for image classification and processing. A standard CNN consists mainly of alternating convolution and pooling layers, which are responsible for extracting features (like for example a vertical boundary line between two fields of different colour) from the input image. Each convolution layer is composed of a number of 2D weights known as filters or kernels. The input to a convolution layer is convolved with the kernels and then activated by an activation function in order to extract feature maps. This process can be expressed as:

$$y_j^l = f\left(b_j^l + \sum_{i=1}^{N_{l-1}} y_i^{l-1} * k_{ij}^l\right) \quad (1.3)$$

where $y_j^l$ is the $j^{th}$ feature map of the current layer, $y_i^{l-1}$ is the $i^{th}$ feature map of the previous layer, $k_{ij}^l$ is the kernel between the $i^{th}$ feature map of the previous layer and the $j^{th}$ feature map of the current layer, $b_j^l$ is the 2D bias associated with the $j^{th}$ feature map of the current layer, $N_{l-i}$ is the number of kernel in the previous layer, f(.) is the activation function, and the operator * denotes a standard convolution operation. The extracted features $y_i^l$ are then down-sampled by a pooling layer in order to enhance the performance of the CNN and reduce the computational burden.

A U-net is a special CNN that is suitable for image-to-image translation tasks ([30] Ronneberger O, Fischer P, Brox T (2015) *U-net: convolutional networks for biomedical image segmentation.* In: Navab N, Hornegger J, Wells W M, Frangi A F (eds) *Medical image computing and computer-assisted intervention—MICCAI* 2015. Springer International Publishing, Cham, pp 234-241). It consists of successive convolutional and pooling layers followed by a number of deconvolution and upsampling layers. The contracting part of the U-net (i.e. the convolution and pooling layers) extracts deep features from the input image, whereas the expansive part of the network (i.e. the deconvolution and up-sampling layers) uses the extracted features to construct a full-resolution output image that corresponds to the input image.

Training of the U-net is carried out in a supervised manner using a training data set composed of input images together with the corresponding ground truth images, the latter representing what we want the U-net to produce as output images on the basis of input images. During the training process, MAE or MSE is typically used as loss functions for computing the error between U-net output and the desired target. The objective of the training process is hence to minimise the Euclidean distance between the U-net output and the truth pixels over all input-target samples in the training data set. However, it was found that relying on the Euclidean distance as a loss function often results in unrealistic blurry output images. To overcome this limitation, conditional generative adversarial networks (conditional GANs or cGANs) have recently been proposed by [20] (Isola, P., Zhu, J. Y., Zhou, T, & Efros, A. A. (2017). *Image-to-image translation with conditional adversarial networks. In Proceedings of the IEEE conference on computer vision and pattern recognition* (pp. 1125-1134).

Conditional GANs are image-to-image translating tools consisting of two CNNs, the generator and the discriminator. Both CNNs are trained simultaneously over a data set of input-target pairs. The generator is responsible for translating the input image to an output image. The discriminator assesses the input image together with a corresponding unknown image to determine whether the unknown image is "true" (i.e. analogous to the target image in the training data set) or "fake" (i.e. an output image generated by the generator). The generator is therefore trained to "trick" the discriminator by producing output images that are indistinguishable from target images. Meanwhile, the discriminator is trained to become better at distinguishing between output/fake images generated by the generator and target images. The idea of this adversarial training process is to use the discriminator's output as a loss function in the training of the generator instead of relying exclusively on MAE or MSE.

Figure 2:
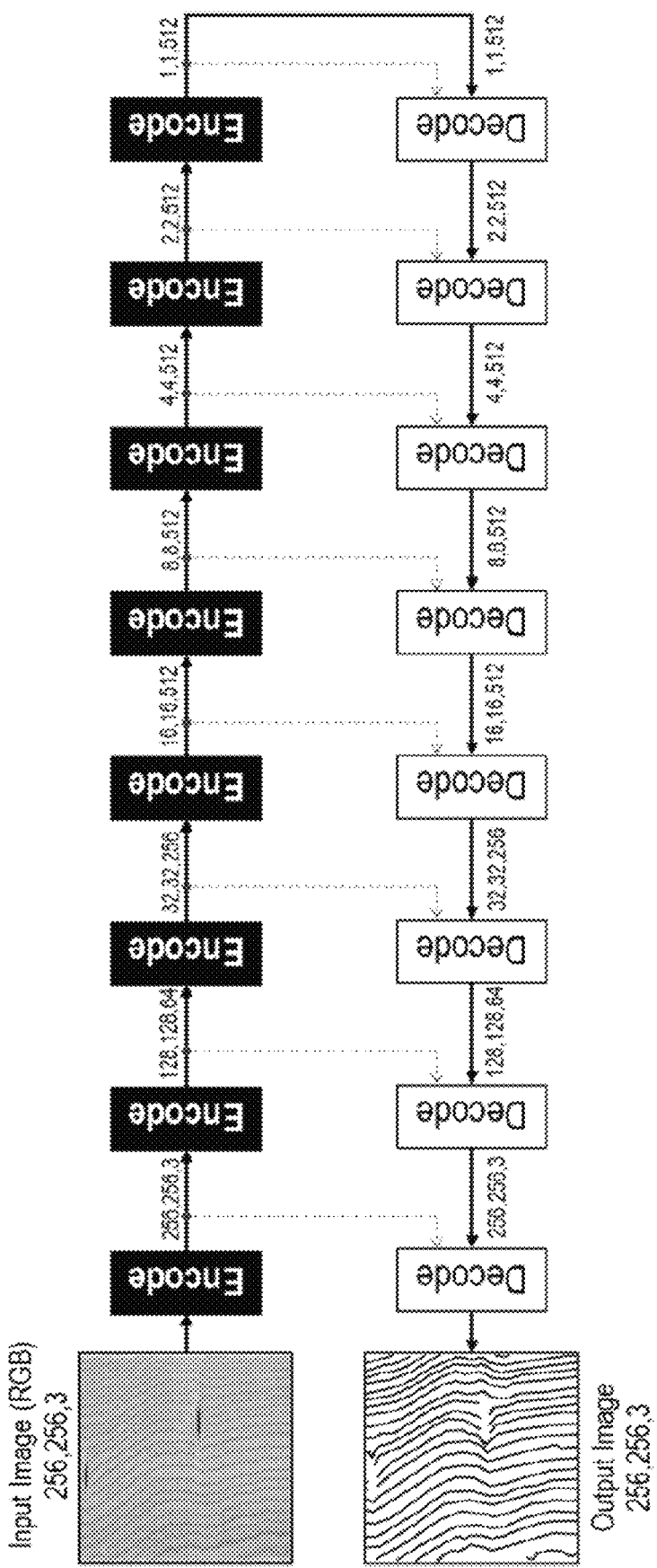
FIG. 2 represents a generator of a cGAN model called "Pix2Pix"

In this work, a powerful cGAN model called "pix2pix" ([20]) was trained to translate RGB images of scanned boards to a binary output that represents the growth rings. The choice of Pix2Pix model was motivated by its success in challenging image-to-image translation problems including translating aerial photographs to maps and sketches to photographs as well as semantic labelling of scenes ([20]). As shown in FIG. 2, the generator of Pix2Pix is a modified version of the U-net designed to translate a 256×256 pixels RGB input image into an output image of the same resolution. In FIG. 2 the "Encode" blocks denote a convolution+batch normalisation+activation operation. The "Decode" blocks represent a deconvolution+batch normalisation+activation operation. The dashed arrows represent "skip connections" introduced to enhance the performance of the generator. The generator attempts to translate the input image into a believable output image that is indistinguishable from the target image in the training data set. Note that the output image shown in FIG. 2 is very similar to a target image which implies that the generator is well trained.

Figure 3:
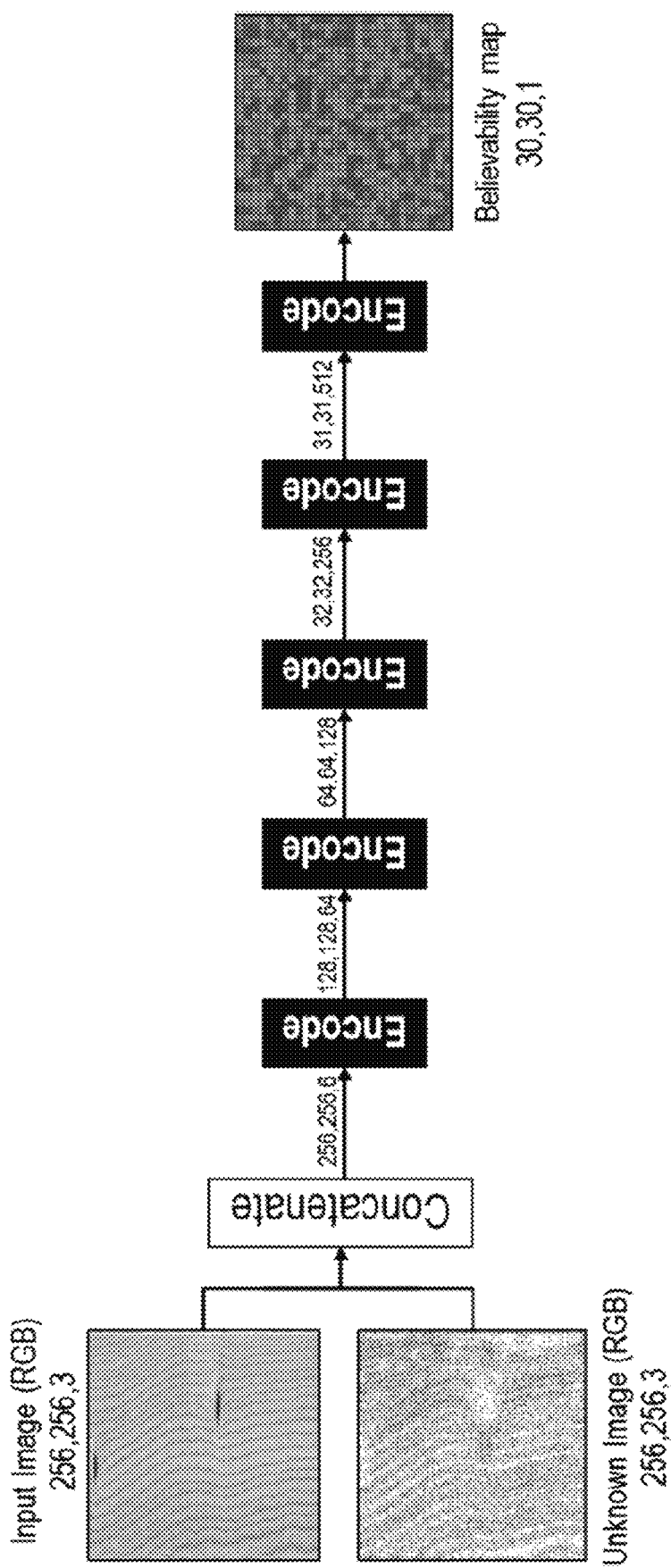
FIG. 3 represents a discriminator of the cGAN model "Pix2Pix"

The discriminator of Pix2Pix (FIG. 3) is another CNN that takes an input image together with an unknown image and tries to determine whether the second image is a true, target image or an output image produced by the generator. In FIG. 3, the "Encode" blocks denote a convolution+batch normalisation+activation operation. The discriminator attempts to determine whether the unknown image is "true" (i.e. same as the target image in the training data set corresponding to the input image) or "false" (i.e. generated by the generator). The output of the discriminator is a 30×30 matrix. Each element of this matrix represents the believability of each 70×70 overlapping portion of the unknown image. An output matrix of zeros indicates that all portions of the unknown image are certainly produced by the generator, while a matrix of ones indicates that the unknown image is indistinguishable from the ground-truth target image corresponding to the input. The unknown image shown in FIG. 3 is actually a rather poor output image produced by a not very well-trained generator. For such an unknown image, a discriminator that is properly trained produces a 30×30 matrix with many numbers close to zero which indicates that the unknown image is a rather poor output image, clearly distinguishable from a target image.

In order to train Pix2Pix, it is required to train both the discriminator and generator according to the procedure illustrated in FIG. 4a and FIG. 4b respectively. The "input" here is a 256×256 pixels RGB image representing a portion of a scanned board. The "output" is the output image generated when the generator processes the input image. The "target" is the ground-truth image in the training data set corresponding to the input image. The weights and biases of both the generator and discriminator are iteratively tuned using the "optimiser" in an attempt to minimise the total loss. The first step is to randomly initialize the parameters (i.e. weights and biases) of both CNNs. An input image from the training data set together with the corresponding target image is then fed into the discriminator; see FIG. 4a. The 30×30 output matrix is compared with a 30×30 reference matrix of ones. The error between the output and reference matrices, computed in terms of sigmoid cross entropy, is called the real loss. Next, the input image is fed into the generator that produces an output image. Both the input and output images are sent to the discriminator, which computes another 30×30 matrix. Sigmoid cross-entropy is used to calculate the error (the generated loss) between the resulting matrix and a reference 30×30 matrix of zeros. The total discriminator loss (i.e. real loss+generated loss) is then used to update the discriminator parameters. After that, the input image together with the output image produced by the generator is fed into the updated discriminator, see FIG. 4b. Sigmoid cross-entropy between the output of the discriminator and a reference matrix of ones is then calculated. The resulting loss is denoted by LcGAN. The error between the output and target images is also computed in terms of MAE (LMAE). The total generator loss is calculated as ([20]):

$$L_{total} = L_{cGAN} + \lambda L_{MAE} \tag{1.4}$$

where $\lambda$ is a weighting factor for LMAE. The total generator loss is then used to update the parameters of the generator. This adversarial training procedure is iterated over all images in the training data set and repeated for a number of training epochs. The output of a successful cGAN training process is a generator capable of producing realistic images that cannot be distinguished from the ground-truth images even by a well-trained discriminator.

A.3—Method

In this section, the method employed in Example 1 to automatically detect individual growth rings and estimate the pith location of timber boards is presented. The algorithm is solely based on information obtained from industrial optical scanning of longitudinal surfaces. In order to verify the results obtained from the automatic algorithms, manual determination of pith locations has been performed as well. Accordingly, this section is divided into two sub-sections giving details of the employed automatic and manual procedures, respectively.

A.3.1—Automatic Procedure for Estimation of Pith Location

The method developed to detect discrete surface growth rings visible on the four sides of boards and to estimate pith location of clear wood sections along the boards consists of three automatic steps:

Step 1: Identify the knot-free clear wood sections along boards on the basis of the knowledge of local fibre orientation obtained from tracheid effect scanning.

Step 2: Detect individual growth rings that are visible on all four sides of the board, on the basis of RGB images of the scanned board surfaces, by using trained cGANs.

Step 3: Estimate the pith location for the identified clear wood sections along timber boards using a trained MLP neural network.

Regarding identification of knot-free clear wood sections, the above described procedure, presented also in [12], was used. According to [12], a clear wood section is defined as the centre of a 10 mm long segment in the longitudinal board direction, across the four sides within which a maximum of 10% of all the determined in-plane fibre directions have an angle that exceeds 12° with respect to the longitudinal direction of the board. In-depth explanation of the remaining two steps is presented in the following sub-sections.

A.3.2—Detection of Surface Growth Rings

Conditional generative adversarial networks (cGANs) were trained and used to detect individual growth rings visible on the four surfaces of boards. Out of the total 112 Norway spruce boards investigated in the current example, seven boards were used to generate input-target training data sets required for cGAN training, and one board was used as a control board to validate the accuracy of the trained cGANs. The annual ring pattern visible on the wide sides of the investigated boards (145 mm) was quite different from ring width and pattern visible on the narrow sides of the boards (45 mm). Annual ring widths observed on narrow sides were larger. Due to such annual ring pattern difference together with the limited available size of the training data set, two separate input-target training data sets were generated, one using the two wide sides and the other using the two narrow sides of the seven boards. These two data sets were used to train two corresponding cGANs, one to detect growth rings visible on wide sides and the other to detect growth rings visible on narrow sides of boards. With a larger training data set, i.e. more than seven boards, it should be possible to train a single cGAN to capture all annual ring patterns/ring widths occurring on any side. Regarding the current use of two different networks for wide and narrow sides, respectively, it was noted that parts of the wide face surfaces, where annual rings are more or less tangential to the surface, actually have a ring pattern that looks more like the patterns on the narrow face surfaces. Still, the same network was used for all areas on wide surfaces.

The adopted cGAN is a Pix2Pix model designed to translate a 256×256 pixels RGB input board image into a binary output image of the same resolution ([20]). In the output binary image, the growth rings visible on the surface of the board (borders between late wood and early wood) are represented by ones (1) and the background by zeros (0). Accordingly, the training data sets were generated by following the same input-output/target structure with a resolution of 256×256 pixels. The input images of the data set were obtained by sliding a 256×256 pixels window over the RGB images of the four sides of the boards with an overlap of 200 and 70 pixels for the wide and narrow sides, respectively. The target part of the data set was produced by manually tracing the surface growth rings visible on the four sides of the boards to create binary images corresponding to annual rings on the RGB images of the seven boards. The resulting binary images were then sliced into several 256×256 pixels binary images to match the input RGB images produced from the scanning data.

Before proceeding to the training stage, two data augmentation procedures were applied to the training input and target images with the aim to enrich the training data sets and improve the performance of the cGANs. The augmentation procedures were to Step 1: rotate the input and target images by 90° in the counterclockwise direction to enhance the generalisation ability of the cGAN and Step 2: shrink the input and target images by 50% in the horizontal direction in order to improve the cGANs ability to detect closely spaced growth rings.

Image pairs resulting from each of the augmentation procedures were added to the original input-target image pairs (giving three times as many pairs as the original number) and shuffled randomly to constitute the final training data set. With such procedure, 9,981 256×256 pixels input-output pair RGB training images were generated. FIG. 5(a) shows the examples of six 256×256 pixels RGB input images paired with the corresponding 256×256 pixels binary target images with no augmentation applied. FIG. 5(b) shows the examples of another six 256×256 pixels RGB input images paired with the corresponding 256×256 pixels binary images, where the first augmentation procedure is applied to the three image pairs to the left and the second procedure is applied to three pairs to the right. Finally, the generated training data sets were used to train the cGANs from scratch using the adaptive moment estimation (Adam) optimiser ([17]) with an initial learning rate of 0.0002 for 200 epochs. A Python (Team 2019) code based on the TensorFlow 1.14 implementation of Pix2Pix cGAN developed by [20] was used to train the cGANs. The weighting coefficient A in Formula (1.4) was taken as 100 as recommended in [20].

Since the cGANs were trained over 256×256 pixels images, the first step in applying the trained networks was to partition scanned RGB board images into images of size 256×256 pixels. Then, the trained cGANs were applied to the resulting 256×256 pixels images to generate binary images that were finally stitched together to match the original RGB images of the boards.

The trained cGANs were validated herein using the control board. FIG. 6(a) shows the RGB image obtained from scanning of a part of the wide side of this board. Dark lines, which represent manually identified annual rings, are drawn on top of the RGB image. FIG. 6(b) shows the translated and stitched binary image indicating the surface annual rings detected by the cGAN. FIG. 6(c), d shows zoomed-in images of a selected part from FIG. 6(a), (b), respectively. A selected section along the board is marked by a line in FIG. 6(a), (c) and a line in FIG. 6(b), (d). In FIG. 6(e), the lateral distance between the consecutive identified annual rings at this section is plotted. A graph represents the distance between manually identified rings and a graph represents the distance between cGAN-detected rings. A local cGAN surface error is defined herein as the absolute difference in annual ring distance between the manual and the cGAN-based detection in a position on the board surface. Thus, the distance in vertical direction of the graphs in FIG. 6(e) constitutes the local cGAN surface errors along the displayed section.

FIG. 7 shows the local cGAN surface error at every grid point (resolution 5×2 mm, in lengthwise×crosswise direction) for the side and part of the board also shown in FIG. 6(a), b. As can be seen, the highest error is registered at a section where a knot is present. It should be noted, however, that the cGANs were not trained to detect annual rings on surfaces containing knots. Moreover, Table 1.1 presents the statistics of the mean local cGAN surface errors in terms of the root-mean-square errors calculated for individual sections along the entire length of the control board.

TABLE 1.1

Statistical results for the mean local cGAN surface error in terms of root-mean-square errors calculated for the individual sections along the control board

| | cGAN error | |
| --- | --- | --- |
| Statistical quantity | Top and bottom (wide) sides (mm) | Left and right (narrow) sides (mm) |
| Mean | 1.9 | 0.8 |
| Median | 1.3 | 0.3 |
| SD | 2.0 | 1.9 |
| 80th Percentile | 3.0 | 0.9 |
| 85th Percentile | 3.5 | 1.0 |
| 90th Percentile | 4.0 | 1.3 |
| 95th Percentile | 5.4 | 2.4 |

A.3.3—Automatic Estimation of Pith Location

Once the discrete surface growth rings are detected, the next step is to estimate pith locations of the identified clear wood sections along the board. According to the study presented in [20], the pith location of a clear wood section can be related to the annual ring width distribution visible across the four sides of a clear wood section. In FIG. 6(e), the annual ring width distribution (in terms of distance between adjacent rings) across one wide face of such a section is shown. In the present research, an MLP network was trained to estimate the pith location by taking the annual ring width distribution of the four sides as an input. To train this MLP network, it is necessary to have a data set that contains a large number of inputs, which are annual ring width distributions of the four sides of sections, along with the desired targets, which are the corresponding pith locations. Obviously, obtaining such data set for actual boards is rather difficult. Therefore, an artificial training data set was generated, and it consisted of artificial annual ring width distributions of simulated board cross sections together with the corresponding pith locations. The artificial cross sections were intended to simulate clear wood cross sections of dimensions 45×145 mm.

The first step in generating an artificial board cross section was to randomly select the x- and y-coordinates of a pith location, $(x_p, y_p)$ within a specified domain in relation to the cross section. The second step was to generate a finite number of discrete circles that are sufficient to cover the cross section by using the following equations:

$$r_i = \sqrt{[x-(x_p+n_i^x)]^2+[y-(y_p+n_i^y)]^2} \quad (1.5)$$

$$r_i = r_{i-1} + dR_i; r_0 = 0 \quad (1.6)$$

where $r_i$ represents a radius of the $i^{th}$ discrete circle, corresponding to the $i^{th}$ annual ring of a real tree. Of course, annual rings of real trees are not perfectly concentric circles. In order to take this into account, to some extent, an eccentricity was applied to the centre of each generated circle by adding a random noise $(n_i^x, n_i^y)$ to the x- and y-coordinates of the pith location $(x_p, y_p)$. The random noise $(n_i^x, n_i^y)$ was selected from a normal distribution of mean 0.05 mm and standard deviation of 0.2 mm. As can be seen in Formula 1.6, a radius r is calculated by adding a small radial increment $dR_i$, to the radius of the preceding discrete circle of radius $r_{i-1}$. The radial increment $dR_i$ is a stochastic value obtained from normal distribution for which the mean value and the standard deviation both depend on i as defined in Table 1.2. The mean values and standard deviations applied are based on measurements of the radial variation of annual growth ring widths of 35-70-year-old Norway spruce trees ([1]).

TABLE 1.2

Mean values and standard deviations for radial increments used to generate circles corresponding to annual rings of artificial board cross sections

| Ring no. i from pith to bark | Mean annual ring width (mm) | Standard deviation (mm) |
|---|---|---|
| 1-9 | 5.1 | 0.9 |
| 10-15 | 3.3 | 0.7 |
| 16-bark | 2.4 | 0.4 |

Once the artificial annual rings were obtained, the next step was to identify the positions of intersection between the annual rings and the four sides of the cross section. Then, the distances between adjacent intersection points were calculated to get the annual ring width distribution of the four sides. FIG. 8 shows an example of artificially generated cross section of dimensions 45×145 mm with the pith location indicated by a cross and the extracted annual ring width distribution of the four sides.

From the annual ring width distribution, a fixed number of data points was extracted from each side by linear interpolation with a resolution of about 2 mm. This was because the size of the input and output layers of an MLP network must be kept constant, as described above. Thus, for the 145-mm-wide sides of the cross section, i.e. top and bottom surface, 72 data points from each side were extracted. From the left and right side of the cross section, a total of 42 data points (21 from each side) were extracted. Once the artificial annual ring width distributions of simulated board cross sections together with the corresponding pith locations were defined, it was possible to produce the training data set for the MLP neural network. In the current example, a total of 100,000 artificial cross sections were used to generate the training data set. The input layer of the MLP network consisted of a column vector obtained by concatenating the extracted data points from all the four sides in a consistent order. This resulted in a training data set which consisted of an input matrix of size 186×100,000 and an output matrix of size 2×100,000, the latter matrix giving the x- and y-coordinates of pith locations of the artificial cross sections.

Out of the training data set, 70% of the sample was used to train the MLP network, 15% was used for validation, and the remaining 15% for testing the trained network. Having a data set for validation is necessary to prevent the network from overfitting the training data ([17]). The neural network was trained from scratch in TensorFlow 2.0 ([31] Abadi M (2016) *Tensorflow: learning functions at scale*. SIGPLAN Not 51(9):1. https://doi.org/10.1145/30226 70.29767 46), using the adaptive moment estimation (Adam) solver with an initial learning rate of 0.001 and the rectified linear unit (ReLU) activation function for 200 epochs. The training performance was assessed by calculating the MSE between the predicted pith location and the target pith location included in the output part of the training data set. FIG. 9 shows the performance of the MLP network in terms of MSE for both the training and validation samples over the 200 epochs.

A.3.4—Manual Determination of Pith Location

For the first subset of four boards, where the pith was located within the board cross sections, manual measurement of pith locations was done by first cutting the boards at the selected clear wood sections and then using a ruler to measure the horizontal and vertical distance, respectively, from one corner of the cross section to the pith. A predefined coordinate system as shown in FIG. 10a was applied. One error source that affects the result is related to the limited precision obtained by the naked eye while measuring the x- and y-coordinates of the pith with a ruler. Another one is related to the fact that board cross sections are not exactly rectangular in shape, for example due to warping during drying, and thus do not comply perfectly with the orthogonal coordinate system used to define positions. Still, the estimated precision and accuracy obtained should be within one millimetre, giving a manual pith error of up to about one millimetre.

For the second subset of 100 boards, pith locations were determined only at the two end cross sections of each board, resulting in 200 manually determined pith locations. The method was to use a transparent plastic sheet with a coordinate system, a scale and closely spaced concentric circles drawn upon it; see FIG. 10(b). By trying to fit the concentric circles of different radii to the growth rings visible on the board end cross sections, as illustrated in FIG. 10(c), the pith locations were determined both for cases where the pith was located either within or outside the board cross section. In FIG. 10(d), a scatter plot of the 200 pith locations determined this way is displayed. About 60% of the pith locations were located outside the board cross section. Regarding precision and accuracy, the result presented in FIG. 10(d) reveals that a precision of about 5 millimetre was applied. (Note, for example, the vertical distance between some blue marks.) The accuracy obtained depends on several factors and in cases where the pith was located outside the cross section it may be rather low, especially for cases where the pith was located far outside the cross section. For such cross sections, the manual determination was most difficult in cases where annual rings visible on the cross sections did not coincide with concentric circles and/or when knots were present in the end cross section. Overall, it is assessed that the manual pith error for board cross sections of subset 2 was often about 5 mm and for some cases probably even larger.

A.4—Results and Discussion

As described in "Method" section above, the proposed automatic method to estimate the pith location of a clear wood section consisted of three steps. The first was to identify knot-free clear wood sections, the second to detect the surface annual rings visible on all the four sides of the board by using the trained cGAN networks and the third to use the trained MLP network to estimate pith locations along clear wood sections. This was done for the 4+100 Norway spruce timber boards described in "Material and data obtained from scanning" section. Comparisons between automatically/algorithmically and manually determined pith locations were made for the two subsets of 4 and 100 boards, respectively. This gives the basis for assessment of the performance of the suggested algorithms.

A.4.1—Assessment on the Basis of Subset 1

For the first subset of four boards, pith locations were estimated on an average of around 11 clear wood sections per board (clear wood sections along boards were identified automatically based on tracheid effect scanning and a criterion of straight fibres in the section, for details see Habite et al. 2020), resulting in a total of 45 estimated pith locations. The errors involved in the automatically and manually determined pith locations can be divided in three different categories or error sources. Namely, the errors introduced during the manual estimation of the pith location (manual pith error), the error introduced during the cGAN surface annual ring detection and the error introduced during MLP pith location. The manual pith error, which is assumed to be much larger for board cross sections of subset 2 than of subset 1, are discussed in "Manual determination of pith location" section. Errors related to the cGANs are to some extent illustrated and discussed in "Detection of surface growth rings" section (FIG. 7). However, the significance of cGAN errors on the estimated pith locations was not covered in that section. Therefore, from here on the term cGAN pith error is used to represent the influence of cGAN surface errors on the determined pith location. Correspondingly, the term MLP pith error is used to represent the influence of errors related to the MLP network on the determined pith location. In order to distinguish between the cGAN pith error and the MLP pith error, algorithmically determined pith locations were calculated on the basis of annual ring width data obtained both from the cGANs and from manually traced rings. Thus, the MLP was applied to two sets of annual ring width data. FIG. 11 shows the absolute difference between manually measured pith locations and the algorithmically estimated pith locations of the first subset, where in FIG. 11(a), the cGAN detected annual rings were used and in FIG. 11(b) the manually traced annual rings were utilised. The absolute difference shown in FIG. 11(a) includes all three error sources (manual pith error, cGAN pith error and MLP pith error), whereas the presented absolute difference shown in FIG. 11(b) excludes the cGAN pith error.

TABLE 1.3

Absolute difference between manually and algorithmically determined pith locations, with and without application of cGAN, for boards of subset 1 comprising 45 estimated pith locations

| | Manual vs algorithmic pith detection | | | | Algorithmic pith detection-cGAN | |
| --- | --- | --- | --- | --- | --- | --- |
| | cGAN annual ring detection in algorithm | | Manual annual ring detection in algorithm | | detected vs manually traced annual rings | |
| Statistical quantity | x-direction (mm) | y-direction (mm) | x-direction (mm) | y-direction (mm) | x-direction (mm) | y-direction (mm) |
| Mean | 2.0 | 3.4 | 1.9 | 2.1 | 1.0 | 2.3 |
| Media | 1.4 | 2.9 | 1.6 | 1.1 | 0.7 | 2.0 |
| SD | 1.7 | 2.7 | 1.6 | 2.7 | 1.1 | 1.7 |
| 80th Percentile | 3.2 | 5.4 | 3.0 | 3.2 | 1.7 | 3.8 |
| 85th Percentile | 4.1 | 5.5 | 3.6 | 3.8 | 2.3 | 4.2 |
| 90th Percentile | 4.8 | 5.7 | 4.6 | 6.2 | 2.8 | 4.4 |
| 95th Percentile | 5.2 | 8.2 | 5.2 | 7.2 | 3.6 | 5.4 |

In Table 1.3, the very same results are displayed in terms of statistics, i.e. with mean values, medians, standard deviations and percentiles (80th, 85th, 90th and 95th) of the differences between manually measured and algorithmically estimated pith locations, with and without the cGAN pith error included in the algorithmically determined pith locations. Table 1.3 also displays the direct differences between the two algorithmically estimated pith locations with and without the cGAN pith errors. In the following, "estimation error" is frequently used for the absolute difference between the manually and algorithmically determined pith locations. Using the suggested algorithm, including the cGAN pith error (FIG. 11(a)), a median estimation error of 1.4 mm and 2.9 mm, a standard deviation of 1.7 mm and 2.7 mm, and a 90th percentile of 4.8 mm and 5.7 mm were achieved in the x- and y-direction, respectively.

As can be seen from FIG. 11 and in Table 1.3, a somewhat smaller error was obtained for the case when the cGAN pith error was eliminated, which is obtained when annual rings were traced manually (FIG. 11(b)), as compared to the results which included the cGAN error. The errors of the algorithmically determined pith location is, in x-direction, about the same but, in y-direction, typically 1-2 mm smaller when the manually traced annual rings are used instead of the cGAN-detected annual rings. However, for board cross section where the errors in y-direction of the algorithmically determined pith location are comparatively large, say above 5 mm, the cGAN pith error is not the main explanation for the total error.

In FIG. 12a, 12b, two different clear wood sections, selected among the 45 evaluated sections of subset 1, are shown. In addition to images of the two cross sections, three different images/stripes, each representing a 10-mm-long section in longitudinal board direction, are shown at each of the four sides of each of the two cross sections. The middle image/stripe of these sets of three shows greyscale image of the side of the board. The other two are binary images showing manually traced and cGAN-detected annual rings, respectively. The lines drawn on top of the stripes indicate the longitudinal position along the board of the cross sections displayed. Two cross marks, drawn on top of the cross sections, indicate the algorithmically determined pith locations including and excluding the cGAN pith error, respectively. The other crosses drawn on top of the cross section indicate the manually measured pith locations, which may here be regarded as true pith locations (since the manual pith error is comparatively small for subset 1).

The clear wood cross sections displayed in FIG. 12a are the cross sections, out of the 45 evaluated, with the largest distance between the pith locations (7.3 mm and 4.6 mm in the x- and y-direction, respectively) determined with the algorithm, including and excluding the cGAN pith error, respectively. Thus, the difference between the two can be attributed to the cGAN pith error. This can be understood by comparing the three images/stripes on the bottom side of this cross section, showing that the cGAN network failed to detect a few annual rings on the bottom side of the cross section where the annual rings are close to tangential to the board surface.

For the cross section shown in FIG. 12b, on the other hand, the distance between the two algorithmically determined pith locations is the smallest among the 45 evaluated sections, only 0.3 mm and 0.1 mm in the x- and y-direction, respectively. In this case, the cGANs seem to give quite accurate annual ring detection on all the four sides, and as a result, the two algorithmically determined pith locations (including and excluding the cGAN pith error) almost coincide with each other. However, the algorithmically determined pith locations are different from the manually determined pith location, with a difference in y-direction of around 8.3 mm. In this case, the estimation error originates from the assumption made during the training of the MLP neural network that annual rings would be circular in shape. This does not agree very well with the shape of the actual growth rings of this cross section. If, in the training of the MLP network (see "Automatic estimation of pith location" section), real data or a more accurate model for artificial cross sections had been used, i.e. if non-circular annual rings had been included in the training data, it is possible that the MLP error would have been smaller.

However, for the present algorithm and the boards of subset 1 it can be concluded that both cGAN errors and MLP errors contribute to the total error. For individual cross sections, any of these error sources may dominate. Of course, the manual pith error may also contribute to the total error, but for a board of subset 1, where the pith is located within the cross section, this error is very small.

A.4.2—Assessment on the Basis of Subset 2

For the second subset of 100 boards, pith locations were manually determined at the two end sections of each board, resulting in a total of 200 determined pith locations. By utilising the cGAN-detected annual rings, automatic estimation of pith locations was done on the closest possible clear wood sections to the two ends of each board. FIG. 13a, b shows the histograms of the difference between the 200 manually determined and automatically estimated pith locations in x- and y-direction, respectively. The results shown in FIG. 13 (a), (b) include all the three error sources defined in "Assessment on the basis of subset 1" section, which are manual pith error, cGAN pith error and MLP error. In Table 1.4, the very same results are displayed in terms of statistics with mean, medians, standard deviations and percentiles (80th, 85th, 90th and 95th) values of the absolute differences between manually determined and automatically estimated pith locations. Using the proposed algorithm, a median absolute difference of 3.9 mm and 5.4 mm and a standard deviation of 6.7 mm and 10.8 mm were achieved in the x- and y-direction, respectively. As can be seen from the results, the estimation errors presented in Table 1.4 are slightly higher than those obtained for the first subset shown in Table 1.3. This may be explained by the significantly higher magnitude of manual pith error introduced during the manual determination of pith location of subset 2 than subset 1; see "Manual determination of pith location" section. Thus, the calculated absolute differences shown in FIG. 13a, b and Table 1.4 should not be interpreted as errors of the suggested automatic procedure alone, but rather as "discrepancies" or upper limits for such errors.

TABLE 1.4

Statistical results for subset 2, comprising 200 estimations of pith location

| Statistical quantity | Discrepancy in x (mm) | Discrepancy in y (mm) |
|---|---|---|
| Mean | 5.0 | 7.6 |
| Median | 3.9 | 5.4 |
| SD | 6.7 | 10.8 |
| 80th Percentile | 7.5 | 11.6 |
| 85th Percentile | 8.6 | 13.8 |
| 90th Percentile | 10.1 | 17.3 |
| 95th Percentile | 14.7 | 24.9 |

A.4.3—Computational Complexity

Training and testing of the cGANs and MLP networks were done using Python in a PC with Intel Xeon E5-2623 v3 CPU at 3.00 GHz (32 GB memory) and NVIDIA Quadro P4000 GPU. After training of the networks, a Python code was implemented to perform the procedure explained in "Detection of surface growth rings" section, which is detection of surface growth rings, and "Automatic estimation of pith location" section, which is estimation of pith location. The computational time required to detect surface growth rings visible on the four sides of a board with nominal dimensions of 45×145×4500 mm was on average 1.4 s, which is equivalent to approximately 300 ms per metre of a board. The computational time required to estimate the pith location of a single clear wood section was on average only 1.3 ms board, which is insignificant as compared to the time required for the application of the cGAN network.

B—Example 2

The scope of Example 2 was limited to knot-free clear wood cross sections of planed Norway spruce timber boards.

In this example, it has been developed an artificial neural network comprising a single artificial neural infrastructure trained to estimate pith location.

B.1—Material

In the present Example, a total sample of 211 planed Norway spruce timber boards with nominal dimensions of 45×145×4500 mm, originating from the areas around the lake Siljan in mid-Sweden and Hamina in south Finland, were analysed. The sample was divided into three subsets, consisting of 4, 200 and 7 boards, respectively. The boards in the first subset had the pith located within their cross sections, and these boards were physically available for comparative manual assessment. The boards in the second and third subsets were available only in digital form through high resolution RGB images (pixel size 0.8 mm and 0.07 mm in lengthwise and crosswise board direction, respectively) and in-plane fibre direction information of all the four surfaces obtained from scanning, and manually determined pith location coordinates. Regarding the position of pith, the second and third subset contained boards both with pith located inside and pith located outside their cross sections. The four boards in the first subset along with 100 out of the 200 boards in the second subset were identical to the samples used in [12] and in Example 1. All the boards included in this Example had already been dried to 12% MC and examined, manually and by means of an optical scanner, within a previous research project reported in [15], which facilitated the deployment of present Example.

Moreover, data of 390 cross sections of Norway spruce logs collected from 22 different stands in Sweden and Finland, was utilised. Säll ([23] Säll, H., 2002. Spiral grain in Norway spruce, Doctoral dissertation, Växjö University Press) measured annual ring distance, from bark to bark through the pith, for each of these log cross sections and used the data in an investigation of spiral grain in Norway spruce timber. The data of annual ring widths was made available for the present research and herein this data was used as basis for a statistical model to generate virtual sawn timber boards.

B.2—Method

According to Example 2, a deep learning-based method has been employed to automatically determine the pith location along Norway spruce timber boards. The disclosed method is based on grayscale images of longitudinal board surfaces obtained from industrial optical scanning. Among the three RGB channels obtained, the green channel has been used to produce the grayscale image, but similar results can also be achieved by using either of the other two channels.

The disclosed algorithm (single artificial neural infrastructure) is based on a trained one-dimensional convolutional neural network (1D CNN) and utilises data of the raw grayscale images of the four sides of a timber board, to automatically determine pith location at different cross section of the board. At each assessed clear wood section, the light intensity of a single pixel line across the four sides is used as an input image to the 1D CNN. FIG. 14(a) shows grayscale images of part of a board; a certain clear wood section is marked by a dashed line running across the four sides of the board and the corresponding light intensity signals at this section are drawn (blue curves) on top of the grayscale images. As an input to the 1D CNN, the light intensity signals are normalised between 0 and 1. For boards investigated in the present Example, the crosswise resolution of the images gives approximately 2070 and 642 data points (pixels), for each wide and narrow board side, respectively. In order to have the same size of the light intensity input signals of the four sides, each signal is resampled to a fixed size of 1024 data points before stacking them as four columns in a 1024×4 matrix representing the light intensity signals of the four sides of the assessed board section. This matrix is the input to the disclosed 1D CNN and the output is the x- and y-coordinates of the pith location. FIG. 14(b) shows the normalised and resampled input light intensity signals of the four sides of the marked section together with an ideal output pith location indicated on the board cross section.

B.2.1—One Dimensional Convolutional Neural Networks

One dimensional convolutional neural networks (1D CNNs) are deep learning tools commonly used for signal classification and regression tasks. A major advantage of 1D CNNs is their ability to combine feature extraction and feature classification or regression operations into a single learning body ([14] Kiranyaz, S., Ince, T and Gabbouj, M., 2015. *Real-time patient-specific ECG classification by 1-D convolutional neural networks. IEEE Transactions on Biomedical Engineering*, 63(3), pp. 664-675). Unlike conventional signal classification techniques that require extraction of user-defined features from the images before conducting the classification task, 1D CNNs can automatically learn the optimal features to extract directly from the training data. Numerous studies have shown that relying on learned features rather than manually extracted ones can significantly improve the accuracy. 1D CNNs have recently achieved the state-of-the-art performance in several challenging tasks including classification of electrocardiogram (ECG) signals [14], speech synthesis ([25] Oord, A. V. D., Dieleman, S., Zen, H., Simonyan, K., Vinyals, O., Graves, A., Kalchbrenner, N., Senior, A. and Kavukcuoglu, K., 2016. *Wavenet: A generative model for raw audio. arXiv preprint arXiv*:1609.03499), and structural and mechanical damage detection ([26] Abdeljaber; O., Avci, O., Kiranyaz, S., Gabbouj, M. and Inman, D. J., 2017. *Real-time vibration-based structural damage detection using one-dimensional convolutional neural networks. Journal of Sound and Vibration*, 388, pp. 154-170; [27] Zhang, W., Li, C., Peng, G., Chen, Y. and Zhang, Z., 2018. *A deep convolutional neural network with new training methods for bearing fault diagnosis under noisy environment and different working load. Mechanical Systems and Signal Processing*, 100, pp. 439-453).

As illustrated in FIG. 16, a 1D CNN consists mainly of alternating convolution and pooling layers, which are used for extracting features from the input image, followed by multilayer perceptron (MLP) layers that process the extracted features and produce the final output. In this 1D CNN the rectified linear unit (Relu) activation function is used for all convolution and MLP layers except the last MLP layer which has linear activation. The quantities between the square brackets correspond to the number of samples x the number of output feature vectors of each convolution and pooling layer.

Each convolution layer is composed of a number of weighting matrices known as filters or kernels. The input signals to a convolution layer are convolved with the kernels and then activated by an activation function in order to extract a number of features vectors.

For a convolution layer with $N_f$ filters, M input signals and T samples in each input signal, the $j^{th}$ output feature vector of a convolution layer, l, is calculated as [27]:

$$y^{j,l} = [y_i^{j,l}] = f(b^{j,l} + x^{j,l}) \tag{2.1}$$

where $$x^{j,l} = [x_i^{j,l}] = Y^{l-1} * W^{j,l} \tag{2.2}$$

$$x_i^{j,l} = \sum_{r=1}^{K}\sum_{c=1}^{M} y_{[i+r-1,c]}^{l-1} w_{[r,c]}^{j,l} \quad (2.3)$$

where the operator (*) denotes a standard convolution operation with a single stride and no zero padding, K is the filter size, $Y^{l-1}$ is a matrix of size T×M that contains the output feature vectors of the previous layer, l–1, $W^{j,l}$ is the $j^{th}$ filter (a matrix of size K×M) of the current convolutional layer, l, $b_j^l$ is a scalar bias, and f(.) is an activation function. The index i ($1 \leq i \leq T-K+1$) denotes a sample in the vectors $y^{j,l}$ and $x^{j,l}$.

Each convolution layer in a 1D CNN is typically followed by a maximum or average pooling layer that down-samples the extracted feature vectors $y^{j,l}$ in order to enhance the performance of the network and reduce the computational effort [17]. By conducting successive convolution and pooling operations, 1D CNNs can extract high-level features that represent the most important information in the input signals. These features are then "flattened" into a single vector and processed by the MLP layers. For an MLP layer, 1, having N neurons and P inputs, the output $y^l$ (vector of size N) can be written as:

$$y^l = g(b^l + W^l y^{l-1}) \quad (2.4)$$

where $b^l$ is a bias vector of size N, $W^l$ is a weighting matrix of size N×P, $y^{l-1}$ is the output of the previous layer l–1 (a vector of size P) and g(.) is an activation function.

The 1D CNN used in this Example is described in FIG. 16.

It has four input channels (i.e. M=4) corresponding to the four light intensity signals of the four sides of a board. The first part of the CNN consists of five convolution/pooling blocks responsible for feature extraction. The first convolution layer of the 1D CNN has 16 filters with a kernel size of K=25. This layer takes the four light intensity signals, resampled at 1024 samples, and convolves them with the 16 filters, resulting in 16 output signals (i.e. features) with a reduced number of samples (1024−25+1=1000 samples). The subsequent pooling layer then decimates these outputs by a factor of two into 16 signals with 500 samples. This process is repeated through the following convolution/pooling blocks until 64 features with only eight samples emerge from the last pooling layer. The features are then flattened into a column vector of size 64×8=512. The flattened features are finally processed by three MLP layers, which produce the estimated $\bar{x}$- and $\bar{y}$-coordinates of the pith location.

Since 1D CNNs belong to the class of supervised neural networks, they are trained over a dataset that contains a number of input observations along with the corresponding desired targets. The first step toward training a 1D CNN is to initialize its parameters (i.e. the filters of the convolution layers and the weights of the MLP layers) with random values. The parameters are then optimised through an iterative training process that involves two operations, forward- and back-propagation. In forward-propagation, an input observation is propagated in the forward direction as described in Formulas (2.1)-(2.4) above starting from the first convolutional layer until an output emerges from the last MLP layer. A certain loss function is then used to calculate the error between the CNN output and the desired target associated with that input sample. Mean squared error (MSE) and mean absolute error (MAE) are examples of commonly used loss functions in regression problems. The computed error is then back-propagated through the CNN starting from the last MLP layer up until the first convolution layer. During the back-propagation process, the sensitivity of each weight and bias in the network to the error is computed. The sensitivities are then used to iteratively update the 1D CNN parameters until a certain stop criterion is met. Several gradient-descent (GD) optimisation methods can be used in the training process such as stochastic gradient descent (SGD) [18] and Adaptive Moment Estimation (Adam) optimiser [19].

B.2.2—Training Dataset

The training of the disclosed 1D CNN has been carried out using a dataset composed of normalised and resampled input light intensity signals of the four sides of boards together with their corresponding x- and y-coordinates of pith location, see FIG. 14.

In practice it is, however, very difficult to obtain a training dataset of thousands of actual boards with known pith location. Therefore, a training dataset constituted of virtual boards with artificial grayscale surface images and known pith location has been generated.

In detail, a total of 3000 virtual boards of dimensions 45×145×205 mm were virtually generated. FIGS. 18 and 19 globally show the four sides of four example boards, with photorealistic RGB surface images.

FIG. 16 shows a region, highlighted by a grid, where the pith could be located as regards generated boards. In FIG. 16 the region is drawn on a 45×145 mm virtual board cross section together with a Cartesian coordinate system ($\hat{x}$, $\hat{y}$) with origin placed at the lower left corner of the board cross section. For a board cross section of size 45×145 mm (which is the only size considered in this Example) placed within the adopted virtual board domain the pith must, by necessity, be located within the highlighted region, which from here on is referred to as the pith location region. As can be seen in FIG. 16, a 100×270 mm virtual board domain corresponds, for a board cross section of size 45×145 mm, to a 55×125 mm pith location region.

The photo-realistic images of the virtual boards together with their known pith locations have been used to generate the input-output pairs of a training dataset, which has been used to train the disclosed deep learning algorithm, i.e. the 1D CNN illustrated in FIG. 16, for automatic location of pith. For the input part of this training dataset, the grayscale light intensity of 42 sections (input portions) distributed along each of the 3000 virtual boards of length 205 mm (5 mm interval between evaluated sections along a board) are considered. This gives a total of 126,000 sections to be used for training and validation. The grayscale light intensity input signals, which are obtained from the four sides of the virtual board sections, are normalised between 0 and 1, resampled to a fixed size of 1024 data points, and stacked vertically as can be seen in FIG. 16. Thus, the size of the input part of the training dataset was 126,000 matrices of dimension 1024×4 and the size of the output part of the training dataset was 126,000 vectors of size 2×1, corresponding to the $\bar{x}$- and $\bar{y}$-coordinates of pith locations of the considered 126,000 sections.

B.3—Training for Automatic Prediction of Pith Location

Out of the total training dataset, 80% was used to train the 1D CNN and 20% was used for validation. Training was done in TensorFlow 2.0 ([22] Abadi, M. (2016, September). *TensorFlow: learning functions at scale. In Proceedings of the 21st ACM SIGPLAN International Conference on Functional Programming* (pp. 1-1)) using the Adam solver with a batch size of 64 and an initial learning rate of 0.0001 for 91 epochs. The training performance was assessed by calculating the mean squared error (MSE) between the estimated pith location and the target pith location included in the output part of the training dataset. FIG. 20 shows the performance of the 1D CNN in terms of MSE for both the training and validation samples over the 91 epochs.

Since the pith of the virtual boards, which are used to train the 1D CNN, are within the pith location region shown in FIG. 17 the trained network should, from the outset, only be applied to boards with pith located within this pith location region, marked by the green rectangular shown in FIG. 21(a). However, a board with pith located outside (below) the pith location region, such as the one shown in FIG. 21(a), would, if it was flipped up-side-down, have the pith located within the pith location region, as shown in FIG. 21(b). This means that even though the 1D CNN was trained for an un-symmetric pith location region/range with respect to the geometric centre of the board cross section it can in practice be applied on boards with pith location within a symmetric extended pith location region as shown in FIG. 21(c). To decide if a board with pith located within the extended pith location region should be flipped or not (to get the pith into the original pith location region) a new 1D CNN, i.e. a classification 1D CNN, was trained to decide if the pith of the board is within or outside/below, the original pith location region. To train the classification network, a training dataset with pith located within the extended pith location region (FIG. 21(c)) containing 126,000 input/output set was used. The output set of this classification 1D CNN is binary, one or zero, such that one (1) indicates that the pith is located in a region above the geometric centre of the board, i.e. within a range of 22.5÷65 mm with respect to the $\bar{y}$-axis and zero (0) that the pith location is located below the geometric centre of the board, i.e. within a range of −20÷22.5 mm with respect to the $\bar{y}$-axis.

Out of the total training dataset, 80% of the sample was used to train the classification 1D CNN and the remaining 20% was used for validation. The network was then trained for 100 epoch in TensorFlow 2.2.0 [22] using the Adam solver with a batch size of 64, an initial learning rate of 0.001 and the ReLU activation function for all the layers except a softmax activation function used at the output layer. The training performance was assessed by calculating the accuracy between the estimated classification class and the target class which was included in the output part of the training dataset. Accordingly, an accuracy of 95% for the training and 89.4% for validation dataset was obtained. The trained classification 1D CNN was applied on a number of sections along a board in order to decide whether the pith of the board is above or below the centre (y-direction) of the board. A board was flipped if more than 50% of the pith of the evaluated sections along the board were classified to be located below the centre of the board.

B.4—Manual Determination of Pith Location

The total sample of 211 boards, as described above, were divided into three subsets of 4, 200 and 7 boards, respectively, and the third subset was used to generate the input-target training datasets. For the first subset of four boards, where the pith was located within the board cross sections, manual measurement of pith locations was done by first cutting each of the boards at certain clear wood sections. Then a ruler was used to determine the $\bar{x}$- and $\bar{y}$-coordinates of the pith with respect to the predefined coordinate system shown in FIG. 22(a). The limited precision obtained by the naked eye while determining the coordinates of the pith with a ruler is considered to be one of the error sources. Another error source is related to the fact that board cross sections are not exactly rectangular in shape, for example due to warping during drying, and thus do not comply perfectly with the orthogonal coordinate system used to define positions. Still, the estimated precision and accuracy obtained should be within one or two millimetres, giving a manual pith error of up to about two millimetres.

For the second subset of 200 boards, pith locations were determined only at the two end cross sections of each board, resulting in 400 manually determined pith locations. A transparent plastic sheet with a coordinate system and closely spaced concentric circles drawn upon it, see FIG. 22(b), was used to manually determine the pith locations. By trying to fit the concentric circles of different radius to the growth rings visible on the board end cross sections, as illustrated in FIG. 22(c), the pith locations were determined both for cases where the pith was located either within or outside the board cross section. In FIG. 22(d) a scatter plot of the 400 pith locations determined this way is displayed and 157 of the pith locations (39%) were located within the board cross section. Regarding precision and accuracy, the result presented in FIG. 22(d) reveals that a precision of about 5 millimetre was applied (note, for example, the vertical distance between the cross marks in FIG. 22(d)). The accuracy obtained depends on several factors and in cases where the pith was located outside the cross section it may be rather low, especially for cases where the pith was located far outside the cross section. For such cross sections, the manual determination was particularly difficult in cases where annual rings visible on the cross sections did not coincide with concentric circles and/or when knots were present in the end cross section. Overall, it is assessed that the manual pith error for board cross sections of subset two were often about 5 mm and for some cases probably even larger.

B.5—Results and Discussion

When applying the disclosed procedure to determine pith location, the first step was to determine whether the pith of a considered board is above or below the geometric centre of the board cross-section. For this purpose, the trained classification 1D CNN was applied on a number of sections along the board in order to decide whether to flip the board up-side-down or not. Then the 1D CNN trained to determine pith location, see FIG. 16, was applied on the grayscale images of the four sides of the board to determine the $\bar{x}$- and $\bar{y}$-coordinates of the pith location along the board.

As stated in Sec. 2, the disclosed algorithm was applied on a total of 204 Norway spruce timber boards with nominal dimensions of 45×145×4500 mm to automatically locate the pith at sections approximately 15 mm apart, which gave around 300 pith locations along each board. Comparison between the automatically and manually determined pith locations were made for the two subsets of 4 and 200 boards and are presented in the following sub-sections.

B.4.1—Assessment on the Basis of Subset One

For boards in subset one, pith locations were manually determined for about 11 clear wood sections per board, resulting in a total of 45 evaluated sections. The clear wood sections were automatically selected based on tracheid effect scanning and a criterion of straight fibres as described in [12]. The manually measured pith locations were compared against automatically determined (1D CNNs) pith locations at the very same clear wood sections, which were extracted from the 300 evaluated sections per board. Table 2.1 displays statistics of results of the discrepancy between manually and automatically determined pith locations at the 45 sections of the first subset of boards. This includes mean, median, standard deviation and percentiles (95th, 90th, 85th and 80th) of discrepancies in x- and y-direction, respectively. The results show a median discrepancy of 1.9 mm and 3.8 mm in x- and y-direction, respectively, and that 95% of the automatically determined pith locations were within 6.3 mm and 10.8 mm margins, in x- and y-direction, respectively, of the manually determined positions. Since all the evaluated cross sections of sample one contained pith, and manual determination of pith location was done by direct measurements of distances from board edges to pith the discrepancies presented in Table 2.1 should, for the most part, represent errors of the automatically determined pith locations.

TABLE 2.1

Statistical results for discrepancies between manually and automatically determined pith locations for subset one, i.e. 45 estimated pith locations

| Statistical quantity | Discrepancy in x-direction [mm] | Discrepancy in y-direction [mm] |
|---|---|---|
| Mean | 2.3 | 4.7 |
| Median | 1.9 | 3.8 |
| S.D. | 1.9 | 3.5 |
| 80$^{th}$ Percentile | 3.8 | 7.9 |
| 85$^{th}$ Percentile | 4.0 | 9.2 |
| 90$^{th}$ Percentile | 4.7 | 10.4 |
| 95$^{th}$ Percentile | 6.3 | 10.8 |

B.4.2—Assessment on the Basis of Subset Two

For boards in subset two, pith locations were determined manually only at end cross sections of each of the 200 boards, which gave a total of 400 estimated pith locations. Table 2.2 shows statistics of results of the discrepancy between manually and automatically determined pith locations for these 400 sections. A median discrepancies of 3.4 mm and 5.3 mm and a standard deviation of 4.3 mm and 6.7 mm were achieved in the x- and y-direction, respectively. These discrepancies are slightly higher than those obtained for the first subset shown in Table 2.1 and this is, at least partly, explained by the higher uncertainty in the manually determined pith locations for the second subset compared to the first subset.

TABLE 2.2

Statistical results for subset two, i.e. 400 estimated pith locations

| Statistical quantity | Discrepancy in x-direction [mm] | Discrepancy in y-direction [mm] |
|---|---|---|
| Mean | 4.7 | 6.9 |
| Median | 3.4 | 5.3 |
| S.D. | 4.3 | 6.7 |
| 80$^{th}$ Percentile | 7.2 | 10.4 |
| 85$^{th}$ Percentile | 8.7 | 12.7 |
| 90$^{th}$ Percentile | 10.7 | 15.0 |
| 95$^{th}$ Percentile | 12.5 | 19.1 |

As already concluded, the discrepancy between manually and automatically determined pith locations depend on the error introduced during the manual measurements (manual pith error) and the error related to the 1D CNN (CNN pith error).

Furthermore, in order to compare the accuracy of the disclosed method utilising a 1D CNN against a previously suggested machine learning based method of Example 1, the current method was applied on the same 100 boards which were used to validate the method in Example 1. These 100 boards constituted half the number of boards in the current subset two for which discrepancies are presented in Table 2.2. Table 2.3 presents the statistical results with mean, medians, standard deviations and percentiles (95th, 90th, 85th and 80th) of the discrepancy obtained by the current 1D CNN method and the ML method presented in Example 1. In the Table, the results obtained in Example 1 are indicated by 'cGAN' whereas the results obtained from the current disclosed method are indicated by '1D CNN'. As can be seen from Table 2.3, the accuracy obtained using the current method is better than the accuracy obtained in Example 1. In particular, the incidence of major errors has decreased, which is shown by the considerable reduction of both the 95% percentile and the standard deviation, the latter reduced by nearly 50% in both the x-direction and the y-direction.

TABLE 2.3

Statistical results for sample two, i.e. 200 estimated pith locations

| Statistical quantity | Discrepancy in x-direction [mm] | | Discrepancy in y-direction [mm] | |
|---|---|---|---|---|
| | cGAN | 1D CNN | cGAN | 1D CNN |
| Mean | 5.0 | 4.1 | 7.6 | 6.0 |
| Median | 3.9 | 3.3 | 5.4 | 4.8 |
| S.D. | 6.7 | 3.5 | 10.8 | 5.5 |
| 80$^{th}$ Percentile | 7.5 | 6.2 | 11.6 | 9.1 |
| 85$^{th}$ Percentile | 8.6 | 7.2 | 13.8 | 10.0 |
| 90$^{th}$ Percentile | 10.1 | 8.5 | 17.3 | 12.7 |
| 95$^{th}$ Percentile | 14.7 | 11.2 | 24.9 | 15.8 |

B.4.3—Computational Complexity

Training and testing of the 1D CNN were done in Python using a PC with Intel Xeon E5-2623 v3 CPU at 3.00 GHz (32 GB memory) and a NVIDIA Quadro P4000 GPU. As described earlier, the automatic location of pith was done on sections approximately 15 mm apart along the board, giving around 300 pith locations for a 4500 mm long board. The computational time required for location of pith at a single section with nominal dimensions of 45×145×4500 mm was on average 1.1 ms. Thus, the calculation time for 300 sections was 330 ms, which is well below a typical industry requirement of about one second per board. The computational speed achieved with the current disclosed method is 127 times faster than the speed obtained in Example 1, which required about 140 ms per section.

The present invention achieves important advantages.

First of all, thanks to the present invention an accurate, operationally simple and robust method and algorithm, solely based on information obtained from optical scanning of longitudinal surfaces, have been developed to estimate the pith location of timber boards.

Moreover, developed algorithms can be fast (see Example 1) or very fast (see Example 2).

Additionally, a method and an algorithm have been developed which allow to estimate the pith location at knot-free clear wood sections of timber boards.

Finally, it should be noted that the present invention is relatively easy to implement and that the cost of implementation is not very high.

The invention claimed is:

1. A computer-implemented method for estimating a pith location with regard to a timber board, the timber board comprising four lateral faces developing along a longitudinal axis of the timber board, the method including:

receiving a pixelated actual digital image of each lateral face of at least a longitudinal part of the timber board, extending along a longitudinal axis of the timber board;

identifying an input portion in said longitudinal part of the timber board, where the input portion is a portion of the timber board which extends along the longitudinal axis;

extracting from each pixelated actual digital image of the longitudinal part of the timber board, an input image representing said input portion, so obtaining four input images representing an appearance of the input portion at each lateral face of the timber board;

inputting said four input images into the input layer of an artificial neural network and making the artificial neural network operate; and reading, at an output layer of the artificial neural network, output data defining a location of a pith of a log from which the timber board has been obtained, in a plane perpendicular to the longitudinal axis of the timber board at the input portion.

2. A computer-implemented method according to claim 1, wherein the artificial neural network comprises a single artificial neural infrastructure trained to output the output data when receiving the input images as input data.

3. A computer-implemented method according to claim 2, wherein the single artificial neural infrastructure is a one-dimensional convolutional neural network (1D CNN).

4. A computer-implemented method according to claim 2, wherein the single artificial neural infrastructure is a two-dimensional convolutional neural network (2D CNN).

5. A computer-implemented method according to claim 1, wherein the artificial neural network comprises a first artificial neural infrastructure and a second artificial neural infrastructure operated one after the other, and wherein:
the first artificial neural infrastructure defines the input layer;
the first artificial neural infrastructure is trained to output intermediate data which identify the position of individual growth rings in the input images;
the intermediate data are used as input data for the second artificial neural infrastructure; and
the second artificial neural infrastructure is trained to output the output data.

6. A computer-implemented method according to claim 4, wherein the first artificial neural infrastructure comprises one or more conditional generative adversarial networks (cGANs).

7. A computer-implemented method according to claim 6, wherein the lateral faces comprise two wide lateral faces and two narrow lateral faces, the wide lateral faces being larger that the narrow lateral faces, and wherein the first artificial neural infrastructure comprises a first conditional generative adversarial network (cGAN) and a second conditional generative adversarial network (cGAN), the first conditional generative adversarial network (cGAN) being trained to use, as input data, the input images representing the appearance of the input portion at each wide lateral face of the timber board, and the second conditional generative adversarial network (cGAN) being trained to use, as input data, the input images representing the appearance of the input portion at each narrow lateral face of the timber board.

8. A computer-implemented method according to claim 5, wherein the second artificial neural infrastructure comprises one or more multilayer perceptron (MLP) networks.

9. A computer-implemented method according to claim 1, wherein each input image is a greyscale image.

10. A computer-implemented method according to claim 1, wherein each input image comprises one or more channels of a RGB image.

11. A computer-implemented method according to claim 1, wherein each input image is a one-dimensional image and where the four input images together represent the appearance of the input portion at the intersection between a plane perpendicular to the longitudinal axis and each lateral face of the input portion.

12. A computer-implemented method according to claim 1, wherein said steps of receiving a pixelated actual digital images, identifying an input portion, extracting input images, inputting the input images into an artificial neural network and reading output data of the artificial neural network, are executed a plurality of times for a plurality of different input images or a plurality of different longitudinal parts of the same timber board and the position of the pith of the timber board is estimated at a plurality of different positions along the longitudinal axis of the timber board.

13. A computer-implemented method according to claim 12 further comprising a step of estimating the pith location at cross-sections of the timber board other than said input portions, in which pith position is estimated by interpolation between the pith locations determined at adjacent input portions.

14. A computer-implemented method according to claim 1, wherein in the step of identifying said input portion, the input portion is identified in a portion of the timber board which comprises knot-free clear wood at each of its lateral faces.

15. A computer-implemented method according to claim 14, wherein in the step of identifying said input portion, the input portion is identified in a portion of the timber board which comprises at least 80% of knot-free clear wood on its lateral surface.

16. A computer-implemented method according to claim 1, wherein identifying said input portion in said longitudinal part of the timber board comprises:
providing fibre data about in-plane wood fibre directions obtained from a surface laser scanning and a tracheid effect detection, with regard to each lateral face of the least one longitudinal part of the timber board to which pixelated actual digital images refer;
using those fibre data to determine an angle formed by in-plane wood fibre directions with the longitudinal axis;
classifying as knot-free clear wood area, any area of the lateral faces in which the determined angle of in-plane wood fibre direction is no more than 20°;
identifying as the input portion a portion of said longitudinal part, which has a longitudinal length at least equal to 5 mm, and in which no more than 20%, of the areas of the lateral faces in which the angle of in-plane wood fibre direction has been determined, has not been classified as knot-free clear wood area.

17. A non-transitory computer readable storage medium storing one or more programs, the one or more programs comprising instructions, which when executed by an electronic device with one or more processors, cause the device to carry out the method of claim 1.

18. A computer system, comprising one or more processors and a non-transitory computer readable storage medium storing one or more programs configured to be executed by the one or more processors, the one or more programs comprising instructions that, when executed by the one or more processors, cause the computer system to carry out the method of claim 1.

19. Apparatus for automated assessment of timber board comprising a computer system according to claim 18 and a plurality of cameras configured to acquire said pixelated actual digital image of each lateral face of at least a longitudinal part of the timber board and to provide them to the computer system.

\* \* \* \* \*